(12) United States Patent
Kamito

(10) Patent No.: US 7,658,477 B2
(45) Date of Patent: Feb. 9, 2010

(54) LIQUID EJECTING HEAD, IMAGING FORMING APPARATUS, DEVICE FOR EJECTING A LIQUID DROP, AND RECORDING METHOD

(75) Inventor: Takao Kamito, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 386 days.

(21) Appl. No.: 11/794,789

(22) PCT Filed: Nov. 10, 2006

(86) PCT No.: PCT/JP2006/022904

§ 371 (c)(1),
(2), (4) Date: Jul. 2, 2007

(87) PCT Pub. No.: WO2007/055412

PCT Pub. Date: May 18, 2007

(65) Prior Publication Data

US 2009/0278895 A1    Nov. 12, 2009

(30) Foreign Application Priority Data

Nov. 11, 2005  (JP)  ............................. 2005-327468
Feb. 1, 2006   (JP)  ............................. 2006-025111

(51) Int. Cl.
*B41J 2/045* (2006.01)

(52) U.S. Cl. ............................. 347/68; 347/65; 347/71; 347/44

(58) Field of Classification Search .................. 347/20, 347/44, 47, 56, 61–65, 67, 68, 70–72
See application file for complete search history.

(56) References Cited

U.S. PATENT DOCUMENTS

| 6,502,929 | B1 * | 1/2003 | Tanaka et al. ................. 347/71 |
| 2002/0149652 | A1 | 10/2002 | Sakamoto et al. |
| 2004/0029305 | A1 | 2/2004 | Chung et al. |
| 2004/0105996 | A1 | 6/2004 | Takagi et al. |
| 2004/0125178 | A1 | 7/2004 | Akahane et al. |

FOREIGN PATENT DOCUMENTS

| EP | 1391304 A1 | 2/2004 |
| JP | 2987954 | 10/1999 |

(Continued)

OTHER PUBLICATIONS

Feb. 20, 2009 European search report in connection with a counterpart European patent Application No. 06 83 2784.

*Primary Examiner*—Juanita D Stephens
(74) *Attorney, Agent, or Firm*—Cooper & Dunham, LLP

(57) ABSTRACT

A liquid ejecting head comprising a nozzle configured to eject a liquid drop of recording liquid, a liquid chamber communicating to the nozzle, and an energy generating device configured to generate energy for pressurizing recording liquid in the liquid chamber is provided, wherein a flow channel forming member configured to form a flow channel for the recording liquid is made of a metal material containing nickel and a peak intensity for a (200) face of nickel is higher than a peak intensity for a (111) face of nickel which intensities are measured by means of X-ray diffraction analysis, or a flow channel forming member configured to form a flow channel for the recording liquid is made of a metal material containing nickel and thallium.

20 Claims, 8 Drawing Sheets

FOREIGN PATENT DOCUMENTS

| | | |
|---|---|---|
| JP | 2000-318160 | 11/2000 |
| JP | 2001-38915 | 2/2001 |
| JP | 2001-130131 | 5/2001 |
| JP | 2002-206188 | 7/2002 |
| JP | 2002-241984 | 8/2002 |
| JP | 2003-25590 | 1/2003 |
| JP | 2003-128968 | 5/2003 |
| JP | 2003-276300 | 9/2003 |
| JP | 2003-342503 | 12/2003 |
| JP | 2004-330636 | 11/2004 |
| JP | 2005-47990 | 2/2005 |
| JP | 2005-178227 | 7/2005 |
| JP | 2005-225958 | 8/2005 |
| JP | 2005-238531 | 9/2005 |
| JP | 2005-280150 | 10/2005 |

\* cited by examiner

LIQUID EJECTING HEAD, IMAGING FORMING APPARATUS, DEVICE FOR EJECTING A LIQUID DROP, AND RECORDING METHOD

TECHNICAL FIELD

The present invention relates to a liquid ejecting head, an image forming apparatus, a device for ejecting a liquid drop, and a recording method.

BACKGROUND ART

As an image forming apparatus such as a printer, a facsimile, a copying machine, and a composite machine thereof, for example, an ink jet recording apparatus is known. The ink jet recording apparatus with a liquid ejecting head as a recording head performs recording (image formation, image printing, character printing, and printing may be used as synonyms.) by ejecting an ink drop as recording liquid onto a medium to be recorded (hereinafter it is called a "paper sheet" which is not limited to a paper as a material but it may be also called a recording medium, a transfer paper, a transfer material and a material to be recorded).

Meanwhile, as a liquid ejecting head, there are known, for example, a liquid ejecting head with a nozzle for ejecting a liquid drop with a size of several μm to several tens of μm, a liquid chamber communicating to the nozzle, a vibrating plate having a member for forming a wall surface of the liquid chamber and a piezoelectric actuator such as a piezoelectric element for pressurizing recording liquid in the liquid chamber via the vibrating plate, a liquid ejecting head with a nozzle for ejecting a liquid drop, a liquid chamber communicating to the liquid chamber and a thermal actuator for pressurizing recording liquid in the liquid chamber based on a phase change caused by film boiling using an electrothermal element such as a heat element, and a liquid ejecting head with a nozzle for ejecting a liquid drop, a liquid chamber communicating to the nozzle, a vibrating plate having a member for forming a wall surface of the liquid chamber and an electrostatic actuator for pressurizing recording liquid in the liquid chamber by displacing the vibrating plate due to an electrostatic force generating between the vibrating plate and an electrode opposing thereto.

Herein, as a nozzle forming member for forming a nozzle hole being a nozzle, as a flow channel forming member for constituting or forming a flow channel of a liquid ejecting head, there are provided, for example, a nozzle forming member which is made of a metal material containing nickel by an electroforming method, as described in JP-A-2003-025590, JP-A-2004-330636, JP-A-2001-038915 and JP-A-2005-178227, a nozzle forming member obtained by punching an organic polymer resin material using an excimer laser, as described in JP-2000-318160, and a nozzle forming member obtained by punching a metal plate made of, for example, SUS, using a punch press, as described in JP 2987954.

Meanwhile, when a flow channel forming member for forming a flow channel such as a nozzle plate, a flow channel plate and a vibrating plate is formed by an electroforming method, an organic additive having an S element in the molecule thereof or an organic additive having a benzene-ring skeleton is usually added, but there may occur a problem such that sulfur brittleness and heat shrinkage are caused when there is performed heat treatment of a primer which is coated for improving the jointing characteristic of the flow channel forming member with a different member in a process for jointing the low channel forming member or a heat treatment process for forming an oxidation preventing film such as a thermal oxidation film on the surface thereof in order to improve the wetting property thereof.

When such sulfur brittleness and heat shrinkage are caused, the flow channel forming member may be hardly jointed with a high precision and the yield thereof may be lowered. Also, when the flow channel forming member is a nozzle plate, there may occur a problem such that the precision of a nozzle hole is lowered and the desired drop ejecting characteristics (such as the drop ejecting speed and the elected drop volume) thereof may be hardly obtained.

Therefore, it may be desired to provide a higher quality liquid ejecting head, an image forming apparatus with the liquid ejecting head, a device for ejecting a liquid drop and with the liquid ejecting head, and a recording method using the liquid ejecting head.

DISCLOSURE OF THE INVENTION

According to one aspect of the present invention, there can be provided a liquid ejecting head comprising a nozzle configured to eject a liquid drop of recording liquid, a liquid chamber communicating to the nozzle, and an energy generating device configured to generate energy for pressurizing recording liquid in the liquid chamber, wherein a flow channel forming member configured to form a flow channel for the recording liquid is made of a metal material containing nickel and a peak intensity for a (200) face of nickel is higher than a peak intensity for a (111) face of nickel which intensities are measured by means of X-ray diffraction analysis.

According to another aspect of the present invention, there can be provided a liquid ejecting head comprising a nozzle configured to eject a liquid drop of recording liquid, a liquid chamber communicating to the nozzle, and an energy generating device configured to generate energy for pressurizing recording liquid in the liquid chamber, wherein a flow channel forming member configured to form a flow channel for the recording liquid is made of a metal material containing nickel and thallium.

According to another aspect of the present invention, there can be provided an image forming apparatus comprising a recording head configured to eject a liquid drop of recording liquid, wherein the recording head is the liquid ejecting head as described above.

According to another aspect of the present invention, there can be provided a device configured to eject a liquid drop from a liquid ejecting head, which comprises the liquid ejecting head as described above.

According to another aspect of the present invention, there can be provided a recording method in which a liquid drop of recording liquid is ejected from the liquid ejecting head as described above, so as to perform recording on a recording medium.

BEST MODE FOR CARRYING OUT THE INVENTION

Figure 1:
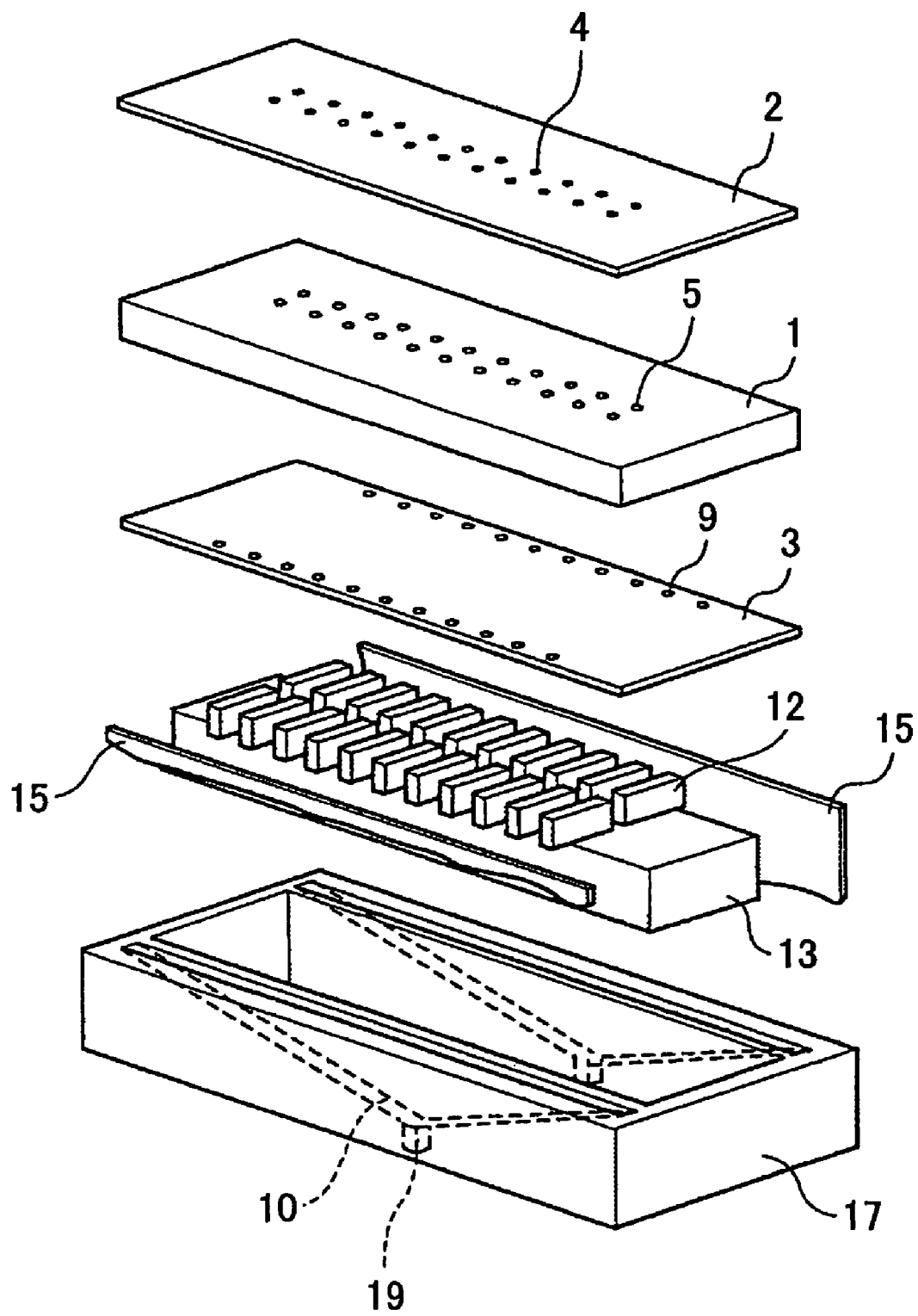
FIG. 1 is an exploded perspective diagram showing a liquid ejecting head of the first embodiment according to the present invention.
Figure 2:
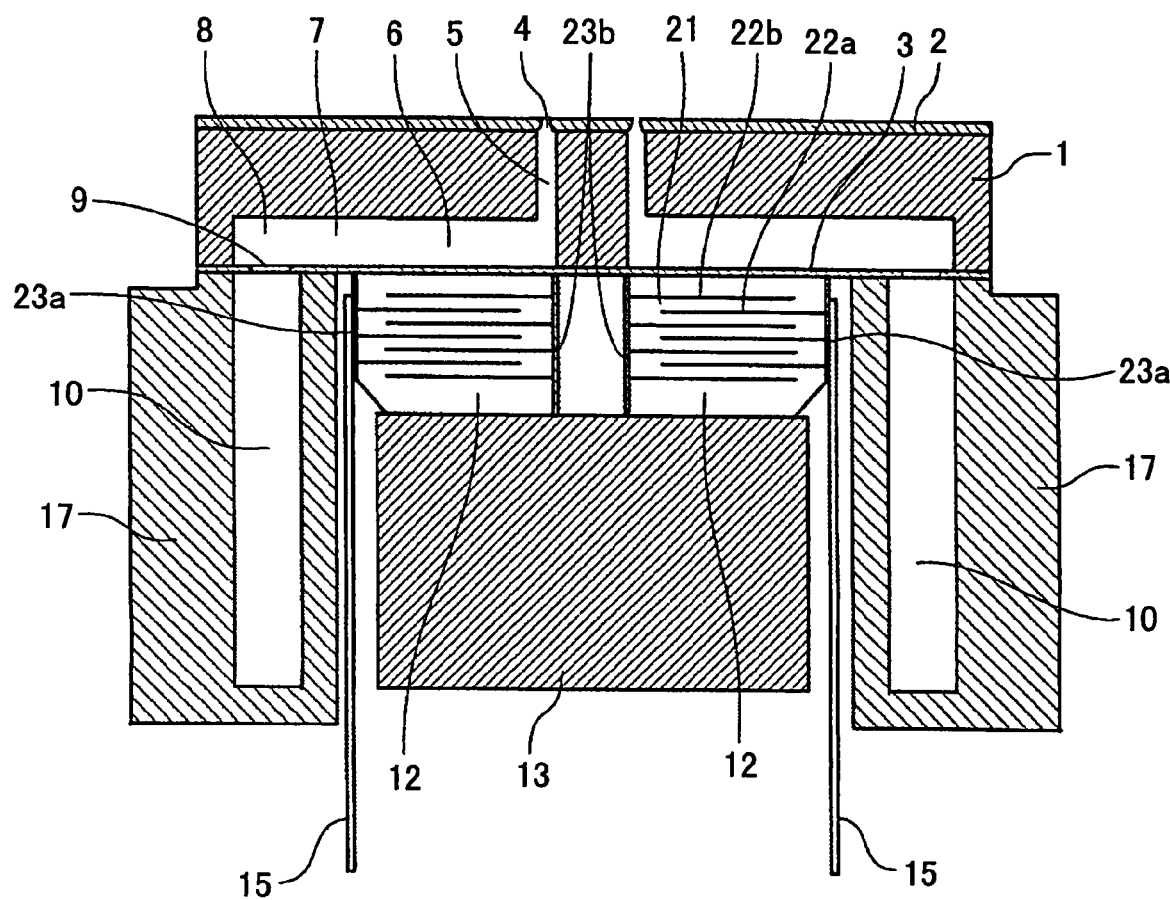
FIG. 2 is a cross-sectional diagram illustrating the head along the longitudinal directions of a liquid chamber.
Figure 3:
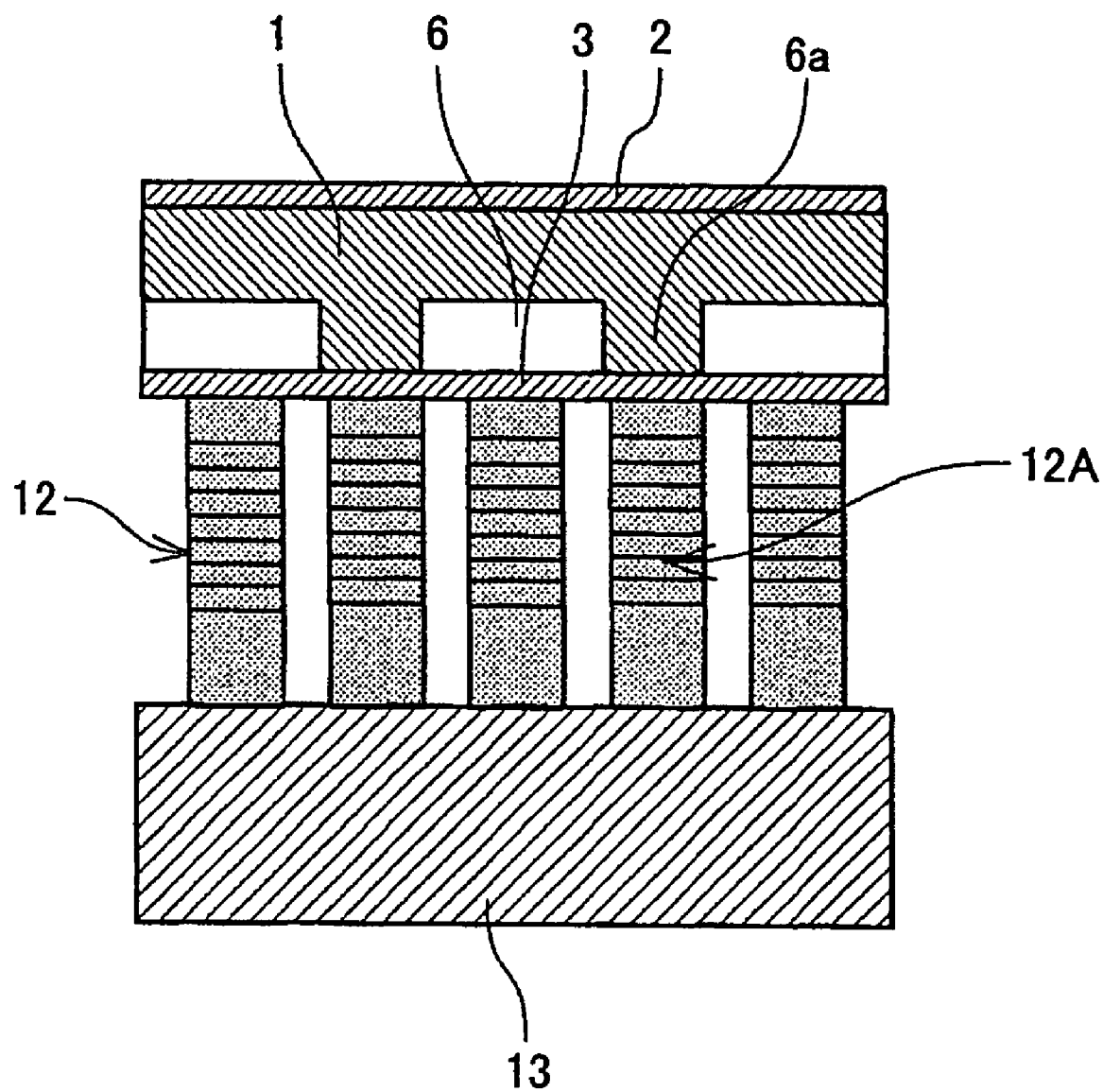
FIG. 3 is a cross-sectional diagram illustrating a bi-pitch structure of the head along the lateral directions of a liquid chamber.

Embodiments of the present invention are described below, with reference to the accompanying drawings. A liquid ejecting head of the first embodiment according to the present invention is described with reference to FIGS. 1 to 4. Herein, FIG. 1 is an exploded perspective diagram of the head, FIG. 2 is a cross-sectional diagram illustrating the head along the longitudinal direction of a liquid chamber, and FIG. 3 is a cross-sectional diagram illustrating the head along the lateral direction of the liquid chamber.

The liquid ejecting head has a flow channel plate 1 which is made of, for example, a single crystal silicon substrate, a nozzle plate 2 which is a nozzle forming member jointed to the upper surface of the channel plate 1, and a vibrating plate 3 which is jointed to the lower surface of the channel plate 1, whereby a pressurized liquid chamber 6 communicating a nozzle 4 for ejecting a liquid drop via a communicating channel 5, a fluid resistance part 7, and a communication part 8 communicating with the liquid chamber 6 via the fluid resistance part 7 are formed and recording liquid (for example, ink) is supplied from a common liquid chamber 10 formed in a frame member 17 described below to the communication part 8 via a supply port 9 formed on the vibrating plate 3.

In the liquid ejecting head, each of the flow channel plate 1, the nozzle plate 2, and the vibrating plate 3 is a flow channel forming member for forming a flow channel for ink as recording liquid.

Then, the upper end face of a laminate-type piezoelectric element 12 as a driving element (such as an actuator device and a pressure generating device) which corresponds to each pressurized liquid chamber 6 is jointed to the outer surface of the vibrating plate 3 having a member which constitutes the wall surface of the liquid chamber 6 (the surface at the opposite side of the liquid chamber 6) via a communication part which is formed on the vibrating plate 3 and is not shown in the figures. Also, the lower end face of the laminate-type piezoelectric element 12 is jointed to a base member 13.

Herein, the piezoelectric member 12 is obtained by alternately laminating a piezoelectric material layer 21 and an inner electrode 22a or 22b and generates a displacement in laminating directions by connecting the end faces of the inner electrodes 22a and 22b to the end face electrodes (external electrodes) 23a and 23b, respectively, and applying a voltage between the end face electrodes 23a and 23b.

Then, a FPC cable 15 is connected by means of solder joining, ACF (anisotropic conductive film) joining or wire bonding in order to supply a driving signal to the piezoelectric element 12, and a driving circuit (driver IC) which is not shown in the figures and provided for selectively applying a driving waveform to each piezoelectric element 12 is mounted on the FPC cable 15.

Figure 4:
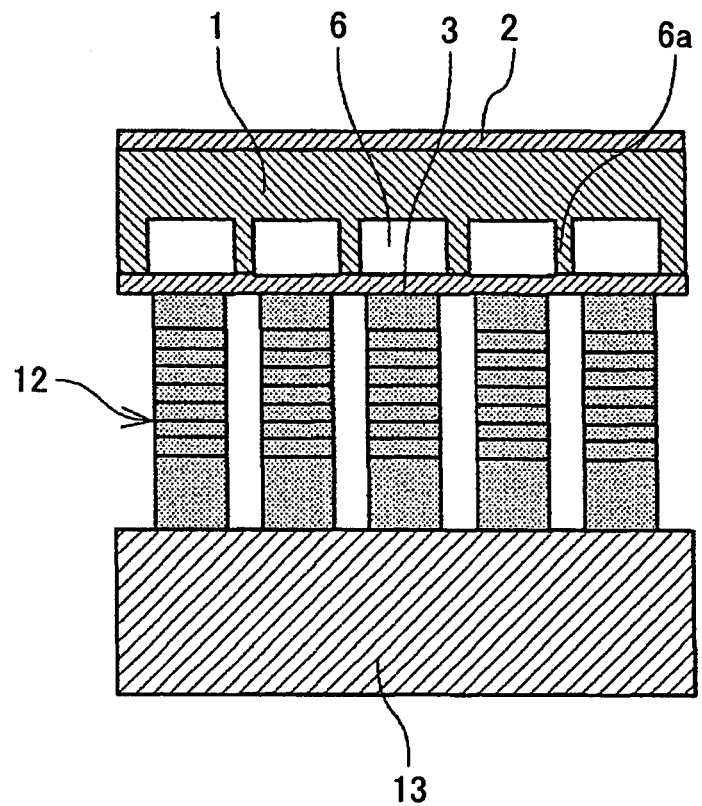
FIG. 4 is a cross-sectional diagram illustrating a normal-pitch structure of the head along the lateral directions of a liquid chamber.

Additionally, in the lateral directions of the liquid chamber (in the directions of alignment of the nozzles 4), a bi-pitch structure in which the piezoelectric element 12 and a pillar part 12A are arranged alternately can be provided as shown in FIG. 3 or a normal pitch structure having no pillar part 12 can be provided as shown in FIG. 4.

In this head, ink in the liquid chamber 6 is pressurized by using a displacement in d33 directions as piezoelectric directions of the piezoelectric element 12 and further, a liquid drop is ejected in accordance with a side-shooter method in which the direction of ejecting a liquid drop is different from the direction of flow of recording liquid. Due to the side shooter method, the size of the piezoelectric element 12 can approximately be the size of the head and the miniaturization of the piezoelectric element 12 directly leads to the miniaturization of the head, so that it is easily to attain the miniaturization of the head.

Further, a frame member 17 formed by injection molding of epoxy resin or poly(phenylene sulfide) is jointed to the peripheral portion of an actuator part composed of the piezoelectric element 12, the base member 13, the FPC 15, etc. Then, while the common liquid chamber 10 described above is formed on the frame member 17, the supply port 19 for supplying recording liquid from the outside to the common liquid chamber 10 is formed and the supply port 19 is further connected to a recording liquid supply source such as a sub-tank and a recording liquid cartridge which are not shown in the figures.

Herein, the flow channel plate 1 provides a channel part constituting the communication channel 5, a through-hole being the pressurized liquid chamber 6, the fluid resistance part 7, the communication part 8, etc., by, for example, anisotropic-etching a single crystal silicon substrate with a crystallographic face orientation of (110) using an alkaline etching liquid such as an aqueous solution of potassium hydroxide (KOH). Additionally, the pressurized liquid chamber is separated by a partition wall 6a.

The nozzle plate 2 is formed from a metal plate of nickel (Ni) and manufactured by an electroforming (electrocasting) method. The nozzles 4 with a diameter of 10-35 μm is formed on the nozzle plate 2 so as to correspond to each pressurized liquid chamber 6 which plate is jointed to the flow channel plate 1 using an adhesive. Then, a face of the nozzle plate 2 at the side of liquid drop ejection (a surface at the side of ejection: an ejection face or a face at the opposite side of the liquid chamber 6) is subjected to a water-repellency treatment.

The vibrating plate 3 is formed from a metal plate of nickel (Ni) and manufactured by an electroforming (electrocasting) method. A part of the vibrating plate 3 which corresponds to the pressurized liquid chamber 6 is a thin part to be easily deformed and a central part thereof is provided with a connection part for connecting to the piezoelectric element 12 which part is not shown in the figures.

The piezoelectric element 12 is formed by jointing a laminate-type piezoelectric element member to the base member 13 and subsequently dividing it by application of a channel processing using, for example, a dicing saw. When the aforementioned bi-pitch structure in FIG. 3 is employed, the pillar part 12A is a piezoelectric element member formed by a channel processing but functions as a simple pillar since no driving voltage is applied.

In thus constructed liquid ejecting head, for example, when it is driven by a pushing and beating method, a driving pulse voltage of 20-50 V from a control part which is not shown in the figures is selectively applied to plural piezoelectric elements 2 according to an image to be recorded whereby the piezoelectric element 12 to which the pulse voltage is applied is displaced so as to deform the vibrating plate 3 to the direction of the nozzle plate 2, and liquid in the liquid chamber 6 is pressurized by the volume (capacity) change of the liquid chamber 6 so as to eject a liquid drop from the nozzle 4 of the nozzle plate 2. Then, the pressure of liquid in the liquid chamber 6 decreases with the ejection of a liquid drop, and a slight negative pressure caused by the inertia of the liquid flow generates in the liquid chamber 6 at this time.

Under the conditions, when the application of a voltage to the piezoelectric element 12 is turned off, the vibrating plate 3 returns to an original position thereof and the shape of the liquid chamber 6 is original one, thereby generating a further negative pressure. At this time, recording liquid from the common liquid chamber 10 is filled in the liquid chamber 6, and a liquid drop is ejected from the nozzle 4 according to the next application of a driving pulse.

Additionally, the liquid ejecting head can be driven by not only the aforementioned pushing and beating method but also, for example, a pulling and beating method (a method for pressurization due to a restoring force of the vibrating plate 3 released from a pulling state thereof) and a pulling, pushing and beating method (a method of keeping the vibrating plate 3 at an intermediate position, then pulling it from the position and pushing it).

Next, the details of the nozzle plate 2 and the vibrating plate 3 are described, each of which is one of flow channel forming member in the liquid ejecting head.

The nozzle plate 2 and the vibrating plate 3 are made of a metal material containing nickel and thallium and formed by an electroforming method. The content of thallium is not greater than 1% by mass of a Ni electroformed film and particularly preferably, not greater than 0.01% by mass thereof. As described below, thallium may be necessary to provide a configuration such that a peak intensity for a (200) face of nickel is higher than a peak intensity for a (111) face of nickel which intensities are measured by means of X-ray diffraction analysis, but, preferably, the content of thallium is not greater than 1% by mass since thallium is not preferable to provide a glossiness and it may be difficult to keep the pH thereof in a desired range. In the range, it can be easy to take the balance with another material used in an electroforming bath.

Figure 5:
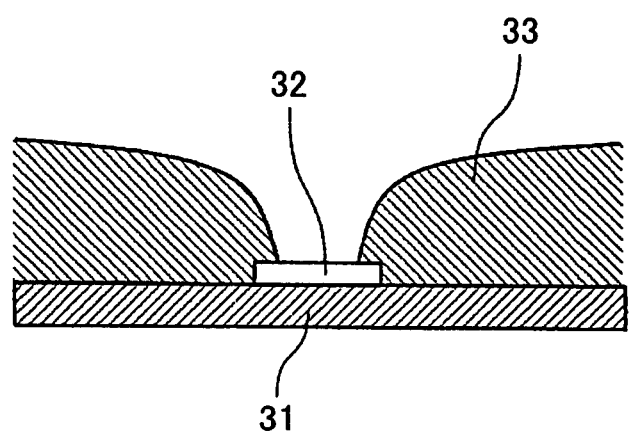
FIG. 5 is a plan view illustrating a nozzle plate of the head.

As the manufacture of the nozzle plate 2 by an electroforming method (an electrocasting method) is described with reference to FIG. 5, the nozzle plate 2 is an electroformed coating 33 obtained by forming a pattern 32 of electrically insulating coating such as a dry resist film (DRF) on a member having an electrical conductivity on at least the surface thereof, for example, an electroformed support substrate 31 such as a silicon substrate having a Ti film formed on the surface thereof, performing the electroforming of Ni, Ni—Co, Ni—Mn, etc. in an electroforming bath on the surface of the electrically conductive support substrate 31 so as to deposit and form the electroformed coating 33, removing the pattern 32 of electrically insulating coating, and further separating the electroformed coating (electrocasted film) 33 from the electroformed support substrate 31.

Also, the vibrating plate 3 is similarly manufactured by an electroforming method and the vibrating plate is electroformed coatings which are repeatedly formed on an electroformed support substrate more than once.

As an electroforming bath used for such an electroforming method, a sulfamate bath is commonly used and a gloss agent (such as sodium 1,3,6-naphthalenetrisulfonate and saccharin), an anode dissolving agent (such as Ni chloride and Ni bromide), and a pH buffering agent are added for the purposes of miniaturization of a crystal, impartation of glossiness to an electroformed film and the reduction of stress. Usually, it is preferable that the temperature of an electroforming bath is approximately 50° C. and a current density is 1-10 A/dm$^2$.

The anode dissolving agent serves to remove, for example, an oxidation film of a Ni pellet which is used for an anode. Boric acid or formic acid is used since it is commonly preferable that the electroforming is performed at a pH of 4-6.

For example, tan Ni electrolyte can be provided which contains 200-400 g/L of Ni sulfamate, 0-10 g/L of Ni chloride, and 30 g/L of boric acid. Sodium 1,3,6-naphthalenetrisulfonate or saccharin is added into it such that the content of sulfur in the Ni electroformed film is 0.1% by mass or less. Then, it is preferable that the content of sulfur approaches to zero as far as possible in order to suppress the sulfur brittleness and it is preferable that the content of sulfur is 0.01% by mass or less.

Additionally, although thallium is herein added into the Ni electroforming bath as described above, the nozzle plate 2 and the vibrating plate 3 can be made of a metal material containing nickel and cobalt or nickel and manganese by addition of cobalt or manganese in the form of cobalt sulfate or manganese sulfamate.

In this case, it is preferable that the content of the added cobalt or manganese is not greater than 1% by mass of the Ni electroformed film and it is particularly preferable that it is not greater than 0.1% by mass of the Ni electroformed film.

It is considered that a suitable amount of cobalt or manganese suppresses the sulfur brittleness at time of heat treatment and it is also considered that a sulfur-manganese compound or a sulfur-cobalt compound is produced but a very high current density may be required to deposit manganese or cobalt on the Ni electroformed film and a disadvantage such as the lowering of toughness and the increase of the degree of heat shrinkage caused by heat treatment may occur. On the other hand, when the amount of the added manganese or cobalt relative to sulfur is small, it may be difficult to suppress the embrittlement.

Since the standard electrode potential of thallium described above is comparatively close to the standard electrode potential of Ni compared to those of cobalt and manganese, thallium can be efficiently deposited and even used for a lower current density.

Herein, an electroformed film containing thallium on the condition described above (practical example 1) and electroformed films containing no thallium (comparison examples 1 and 2) were manufactured and X-ray diffraction intensities for the manufactured electroformed films were measured by using an X-ray diffraction apparatus. As a peak intensity for a (111) face of nickel is denoted by I(111) and a peak intensity for a (200) face of nickel is denoted by I(200) which were measured by the X-ray diffraction analysis, the intensity ratio of oriented crystallographic faces which is defined as the ratio of the peak intensity of a (200) face of nickel to the peak intensity of a (111) face of nickel is denoted by I(200)/I(111). Also, for each electroformed film, the degree of heat shrinkage thereof when heat treatment was performed and the Vickers hardness thereof were measured. The result of these measurements is shown in Table 1.

TABLE 1

| | Electro-formed film | Heat treatment | I(200)/ I(111) | Vickers hardness (HV) | Degree of heat shrinkage |
|---|---|---|---|---|---|
| Practical example 1 | Ni + thallium | — | 9.09 | 317.0 | — |
| | | 350° C. | 4.76 | 316.0 | 23 ppm |
| Comparative example 1 | Ni | — | 0.64 | 480.7 | — |
| | | 275° C. | 0.48 | 368.7 | 254 ppm |
| Comparative example 2 | Ni | — | 0.33 | 469.2 | — |
| | | 350° C. | 0.19 | 315.0 | 432 ppm |
| Comparative example 3 | Ni | — | 0.33 | 505.0 | — |
| | | 350° C. | 0.09 | 270.0 | 540 ppm |

As seen in Table 1, the electroformed film containing nickel and thallium has a crystallographic orientation such that the peak intensity for a (200) face of nickel is higher than the peak intensity for a (111) face of nickel. Particularly, when the Ni electroformed film for which the intensity ratio satisfies a condition of I(200)/I(111)≧3.0 was subjected to heat treatment at 350° C. for 1 hour, the Vickers hardness thereof was a little or not changed and the degree of shrinkage between before and after the heat treatment (the degree of heat shrinkage) was 23 ppm, so that no or a little embrittlement occur and heat shrinkage does not easily occur.

On the other hand, when the aforementioned Ni electroformed films containing no thallium (, cobalt or manganese) were subjected to heat treatment at 275° C. for 1 hour, the change of the Vickers hardness thereof was greater than 20% and the degree of heat shrinkage thereof was greater than 200 ppm. Further, when the heat treatment at 350° C. for 1 hour was conducted, the change of the Vickers hardness thereof was greater than 30% and the degree of heat shrinkage thereof was greater than 400 ppm. Therefore, the Ni electroformed films were embrittled and it may not be possible to obtain a flow channel forming member with a high dimension-accuracy.

Thus, when a flow channel forming member for forming a flow channel for recording liquid is made of a metal material containing nickel and the peak intensity for a (200) face of nickel is higher than the peak intensity for a (111) face of nickel which intensities are measured by means of X-ray diffraction analysis, the sulfur embrittlement can be suppressed and the embrittlement and heat shrinkage which are caused in a heat treatment process can be reduced, so that jointing with another component which involves heat treatment process can be attained with a high precision.

Also, an oxidation preventing film (such as an ink-resistant liquid contact film), for example, a thermally oxidized film obtained by applying heat treatment on a surface of the flow channel forming member which surface contacts recording liquid can be formed without shrinkage or embrittlement of the flow channel forming member. Thereby, an liquid ejecting head with an excellent drop ejection characteristic can be obtained. Further, since the Vickers hardness is a little or not reduced, there is a little or no warping (stress), so that jointing can be conducted with a high precision.

Also, when a flow channel forming member for forming a flow channel for recording liquid is made of a metal material containing nickel and thallium, a flow channel forming member such that the peak intensity for a (200) face of nickel is higher than the peak intensity for a (111) face of nickel which intensities are measured by means of X-ray diffraction analysis can be easily formed without increasing a current density, whereby a liquid ejecting head with an excellent drop ejection characteristic can be obtained with a high precision as described above.

Then, when the present invention is applied on a nozzle plate, the precision of a nozzle diameter can be improved with a little heat shrinkage caused by heat treatment. Also, when the present invention is applied on a vibrating plate, the precision of a component of the vibrating plate can be improved with a little heat shrinkage caused by heat treatment. Further, although an example of applying the present invention on the nozzle plate and the vibrating plate as flow channel forming members is described in the aforementioned embodiment, the present invention can be also applied on a flow channel plate, so that a flow channel plate can be obtained with a high precision while a little heat shrinkage is caused by heat treatment and no expensive material such as silicon is used.

Figure 6:
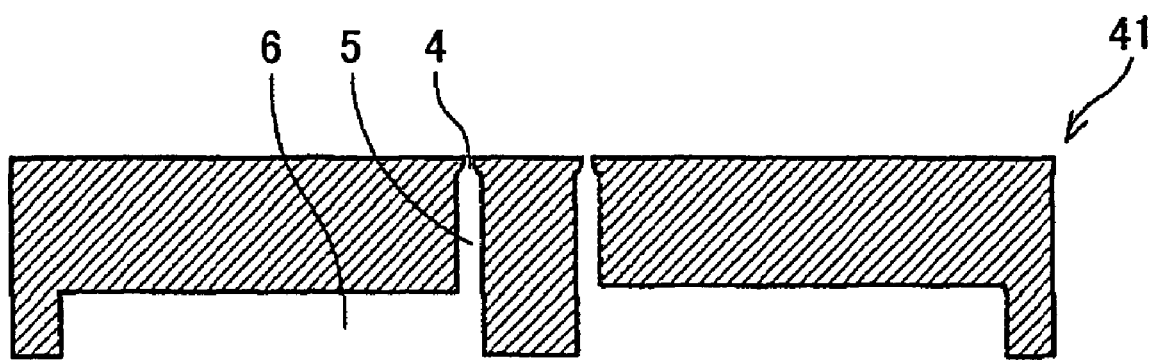
FIG. 6 is a cross-sectional diagram illustrating one example of a member in which a nozzle plate and a flow channel plate are integrally formed.
Figure 7:
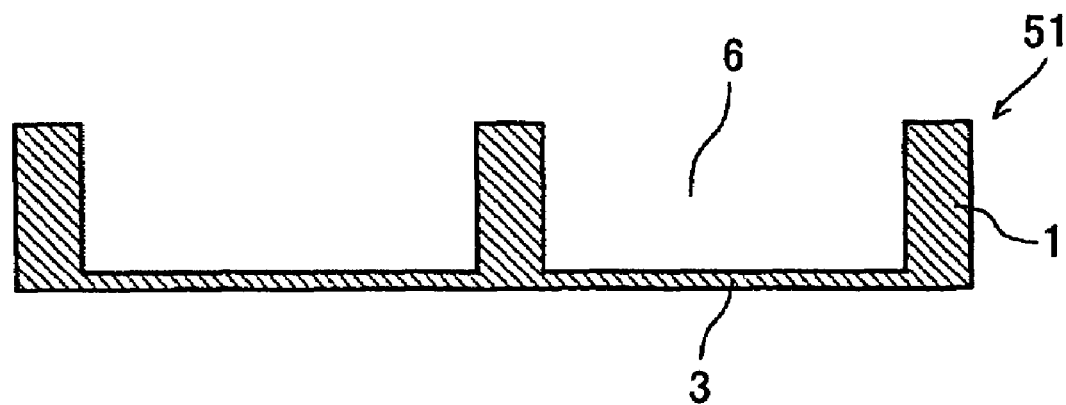
FIG. 7 is a cross-sectional diagram illustrating one example of a member in which a vibrating plate and a flow channel are integrally formed.

Also, for example, a member 41 in which a nozzle plate and a flow channel plate are integrally formed or a member 61 in which a vibrating plate 53 and a flow channel plate 52 are integrally formed can be obtained as shown in FIG. 6, by forming a flow channel forming member in accordance with an electroforming method, and the present invention can be applied on such a member. Due to such a configuration, the degree of heat treatment for jointing can be reduced and costing down can be attained.

Figure 8:
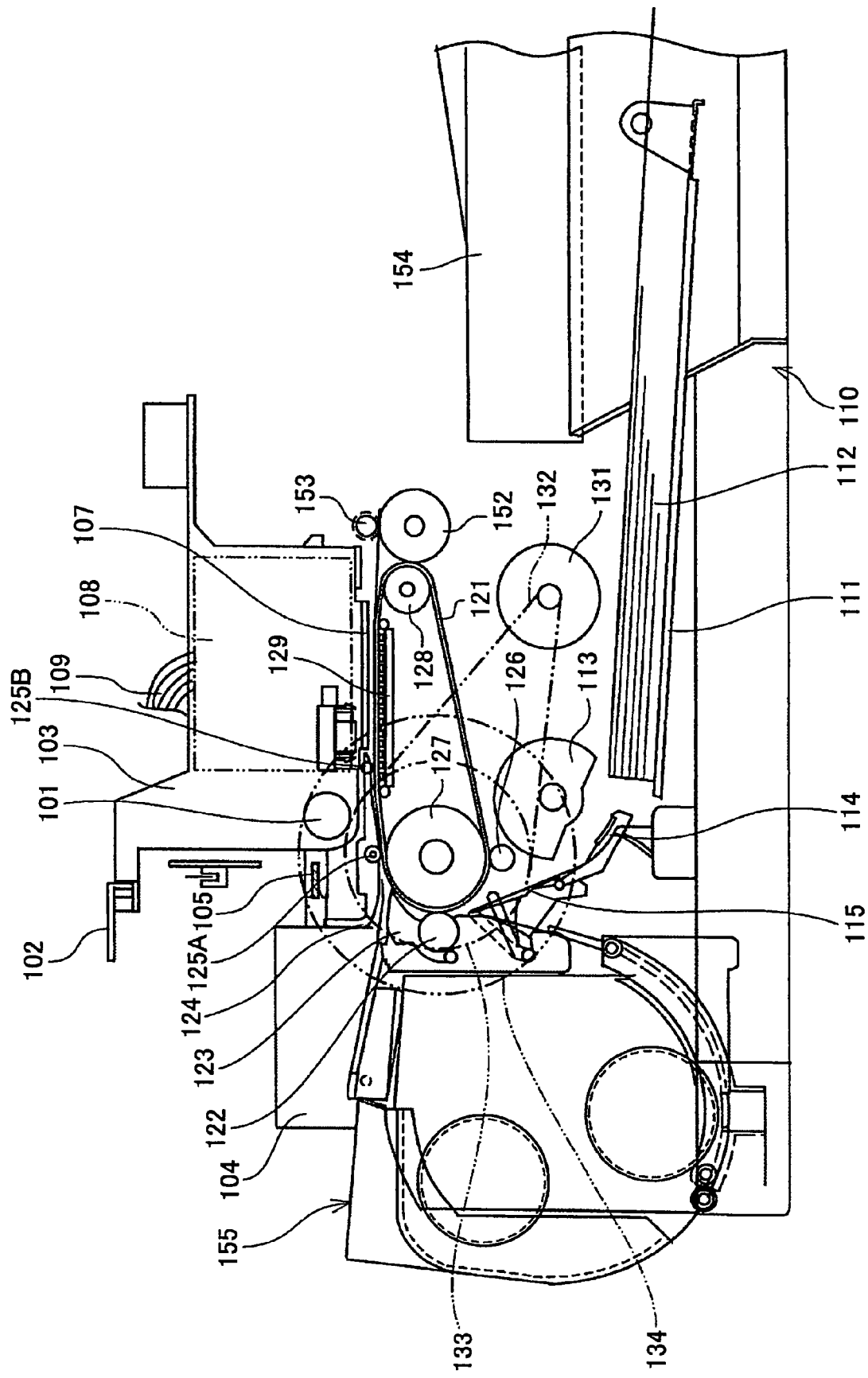
FIG. 8 is a general-structural diagram showing one example of an image forming apparatus according to the present invention.
Figure 9:
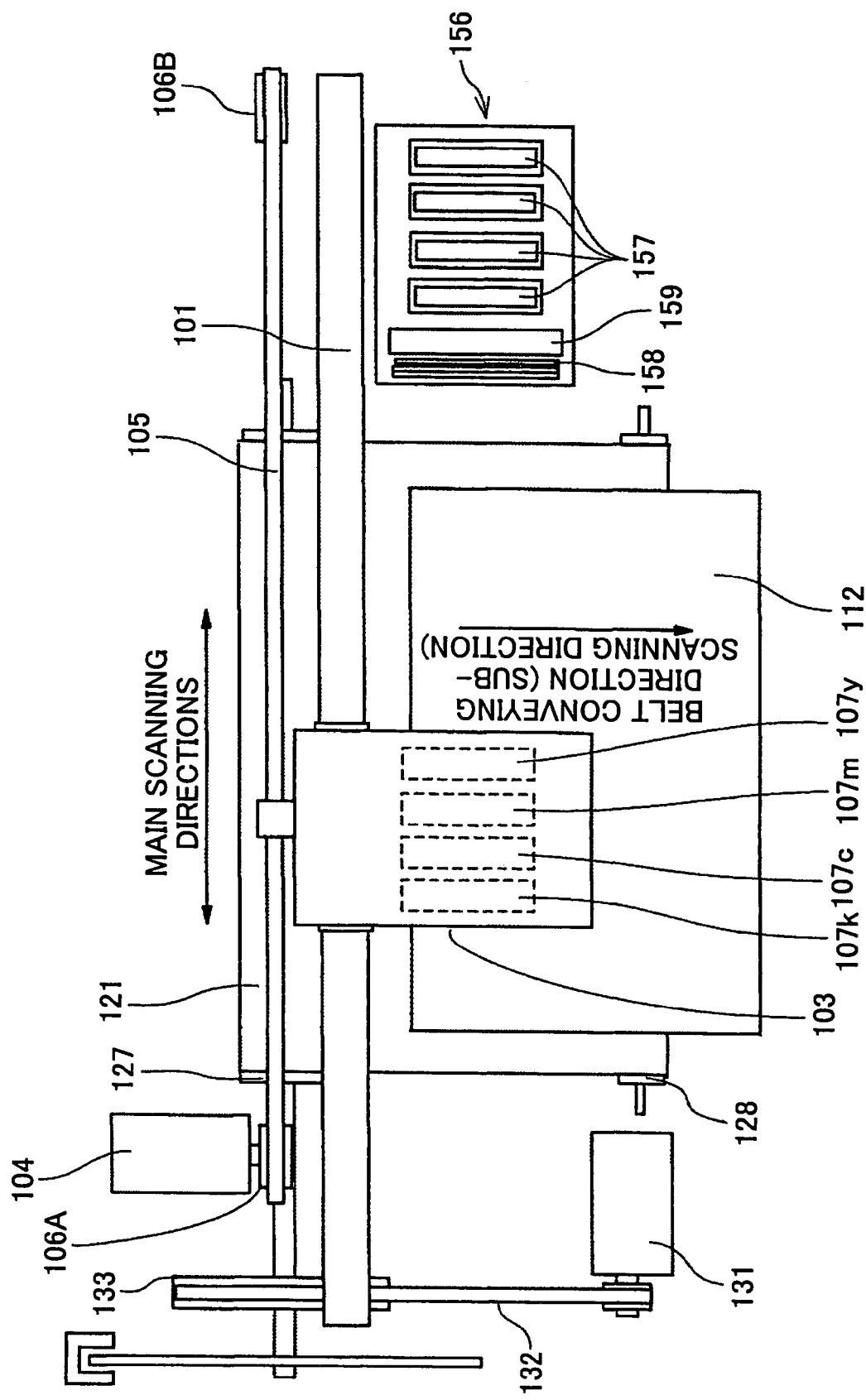
FIG. 9 is a plan view illustrating the essential part thereof.

Next, one example of an image forming apparatus including a device for ejecting a liquid drop according to the present invention which is provided with a liquid ejecting head according to the present invention is described with reference to FIGS. 8 and 9. Herein, FIG. 8 is a side view illustrating the entire structure of the image forming apparatus and FIG. 9 is a plan view illustrating an essential part of apparatus.

The image forming apparatus includes a guide rod 101 and a guide rail 102 which are guide members extending between and supported by the right and left side plates which are not shown in the figures and slidably hold a carriage 103 in the main scanning directions, which carriage is moved for scanning in the directions of arrows (the main scanning directions) using a timing belt 105 extending over a driving pulley 106A and a passive pulley 106B which are driven by a main scanning motor 104.

On the carriage 103, a recording head 107 composed of four independent liquid ejecting heads 107k, 107c, 107m and 107y according to the present invention which eject a liquid drop (ink drop) of recording liquid of each color (such as black (K), cyan (C), magenta (M) and yellow (Y)) is arranged in directions along the main scanning direction and provided such that the liquid drop ejecting direction is set downward. Additionally, although the independent liquid ejecting head is used herein, one or plural heads having plural nozzles for ejecting a liquid drop of recording liquid of each color may be also used. Also, the number and arrangement order of colors are not limited to them.

A sub-tank 108 of each color for supplying ink of each color to the recording head 107 is mounted on the carriage 103. Ink is fed and supplied from a main tank (ink cartridge) which is not shown in the figures through an ink supply tube 109 to the sub-tank 108.

Furthermore, a paper feeding part for feeding a medium to be recorded (paper sheet) stacked on a paper stacking part (pressing plate) 111 such as a paper feeding cassette 110 includes a separating pad 114 facing a crescent control roller (paper feeding roller) 113 and made of a material with a high friction coefficient which is provided for separating and feeding paper sheets 112 one by one from the paper stacking plate 111, and the separating pad 114 is pushed to the side of the paper feeding roller 113.

Then, as a conveying part for conveying the paper sheet 112 fed from the paper feeding part under the recording head 107, there is included a conveyor belt 121 for electrostatically attracts and conveying the paper sheet 112, a counter roller 122 for pressing the paper sheet 112 fed from the paper feeding part via a guide 115 against the conveyor belt 121 and conveying it, a conveying guide 123 for changing the moving direction of the paper sheet 112 fed approximately vertically and upward by approximately 90° so that it is laid on the conveyor belt 121, a pressing roller 125A and a leading edge pressing roller 125B which are pushed to the side of the conveyor belt 121 by a pressing member 124. Also, a charging roller 126 as a charging device for charging the surface of the conveyor belt 121 is included.

Herein, the conveyor belt 121 is an endless belt, extends over a conveying roller 127 and a tension roller 128, and rotates to a belt rotation direction (a sub-scanning direction) by rotating the conveying roller 127 using a timing belt 132 and a timing roller 133 which are driven by a sub-scanning motor 131. Additionally, a guide member 129 is arranged in a location corresponding to an image forming area of the recording head 107 at the back side of the conveyor belt 121.

The charging roller 126 is located so as to contact the front surface of the conveyor belt 121 and to passively rotate by the rotation of the conveyor belt 121 and applies a pressure of 2.5 N to each end of a shaft.

Further, as a paper ejecting part for ejecting the paper sheet 112 on which an image has been recorded by the recording head 107, there are included a sheet separating part for separating the paper sheet 112 from the conveyor belt 121, a paper ejecting roller 152, another paper ejecting roller 153, and an ejected paper tray 154 for stocking the ejected paper sheet 112.

Also, a double-face paper feeding unit 155 is detachably attached to the back portion thereof. The double-face paper feeding unit 155 receives and reverses the paper sheet 112which is conveyed backward by the conveyor belt 121 rotating in the opposite direction, and feeds it again into the space between the counter roller 122 and the conveyor belt 121.

Further, as shown in FIG. 14, a maintenance and refreshing mechanism 156 for maintaining or refreshing the state of a nozzle of the recording head 107 is arranged in a non-printing area at the side of one of the scanning directions of the carriage 103.

The maintenance and refreshing mechanism 156 includes caps 157 for capping respective nozzle faces of the recording head 107, a wiper blade 158 which is a blade member for wiping the nozzle face, and a blank-ejection receiver 159 for receiving a liquid drop when blank ejection is performed ejecting in which the liquid drop does not contribute to recording and is ejected to eliminate thickened recording liquid.

Next, an ink as recording liquid used in a recording method according to the present invention is described in which method a liquid drop is ejected from a liquid ejecting head according to the present invention to conduct recording on a recording medium (paper sheet).

An ink used in the recording method according to the present invention contains, at least, water, a coloring agent and a wetting agent, and further a penetrating agent, a surfactant and another component according to need.

Herein, the surface tension of the ink at 25° C. is 15-40 mN/m, and preferably 20-35 mN/m. If the surface tension is less than 15 mN/m, a nozzle plate (nozzle board) of the liquid ejecting head according to the present invention is wetted excessively so that it may be difficult to form an ink drop (particle), bleeding on a recording medium used in the recording method according to the present invention may become significant, and it may be difficult to attain stable ejection of ink. On the other hand, if it is greater than 40 mN/m, the no sufficient penetration of ink into a recording medium may be caused and the occurrence of beading or a prolonged drying time may be caused.

The surface tension can be measured at 25° C. by using, for example, a surface tensiometer (CBVP-Z available from Kyowa Interface Science Co., Ltd.) and a platinum plate.

Also, as a coloring material of ink, either a pigment or a dye can be used and a mixture thereof can be used. Additionally, when a pigment is used, it is relatively easy to form a high quality image with excellent weatherability and water resistance on a normal paper sheet, compared to a dye.

[Pigments]

As a pigment, the following ones can be preferable used. Also, a mixture of plural kinds of the pigments may be used.

As an organic pigment, there can be provided, for example, azoic, phthalocyanine-based, anthraquinone-based, quinacridone-based, dioxazine-based, indigo-based, thioindigo-based, perylene-based, and isoindolinone-based pigments, aniline black, azomethine-type pigments, rhodamine B lake pigment, and carbon black.

As an inorganic pigment, there can be provided, for example, iron oxide, titanium oxide, calcium carbonate, barium sulfate, aluminum hydroxide, barium yellow, iron blue, cadmium red, chrome yellow, and metal powder.

The particle diameter of the pigment is preferably 0.01-0.30 μm, and if it is 0.01 μm or less, the light fastness thereof may be degraded or feathering may be easily caused since the particle diameter is close to that of dye. On the other hand, if it is 0.30 μm or greater, clogging of an ejection port or a filter in a printer may be caused and stable ejection may be hardly attained. 0.01-0.16 μm is more preferable from the viewpoint of the clogging or the stable ejection.

As a carbon black used for a black pigment ink, preferable is a carbon black manufactured by a furnace method or a channel method and having a primary diameter of 15-40 millimicrons, a BET specific surface area of 50-300 square meter/g, a DBP oil absorption of 40-150 ml/100 g, 0.5-10% of a volatile component, and a pH value of 2-9. As such, there can be used, for example, No. 2300, No. 900, MCF-88, No. 33, No. 40, No. 45, No. 52, MA7, MA8, MA100, No. 2200B (which are available from Mitsubishi Chemical Corporation), Raven 700, Raven 5750, Raven 5250, Raven 5000, Raven 3500, Raven 1255 (which are available from Columbian Chemicals Company), Regal 400R, Regal 330R, Regal 660R, MogulL, Monarch 700, Monarch 800, Monarch 880, Monarch 900, Monarch 1000, Monarch 1100, Monarch 1300, Monarch 1400 (which are available from Cabot Corporation), Color black FW1, Color black FW2, Color black FW2V, Color black FW18, Color black FW200, Color black S150, Color black S160, Color black S170, Printex 35, Printex U, Printex V, Printex 140U, Printex 140V, Special black 6, Special black 5, Special black 4A, and Special black 4 (which are available from Degussa), but it is not limited to them.

Specific examples of color pigments are provided below.

As an organic pigment, there can be provided, for example, azoic, phthalocyanine-based, anthraquinone-based, quinacridone-based, dioxazine-based, indigo-based, thioindigo-based, perylene-based, and isoindolinone-based pigments, aniline black, azomethine-type pigments, rhodamine B lake pigment, and carbon black, and as an inorganic pigment, there can be provided, for example, iron oxide, titanium oxide, calcium carbonate, barium sulfate, aluminum hydroxide, barium yellow, iron blue, cadmium red, chrome yellow, and metal powder.

Specifically, the following ones for each color are provided below.

As an example of a pigment which can be used for yellow ink, there can be provided, for example, CI pigment yellows 1, 2, 3, 12, 13, 14, 16, 17, 73, 74, 75, 83, 93, 95, 97, 98, 114, 128, 129, 151, and 154, but it is not limited to them.

As an example of a pigment which can be used for magenta ink, there can be provided, for example, CI pigment reds 5, 7, 12, 48 (Ca), 48 (Mn), 57 (Ca), 57:1, 112, 123, 168, 184, and 202, but it is not limited to them.

As an example of a pigment which can be used for cyan ink, there can be provided, for example, CI pigment blues 1, 2, 3, 15:3, 15:34, 16, 22, and 60, and CI vat blue 4 and 60, but it is not limited to them.

Also, a pigment which is newly manufactured for the present invention can be used as a pigment contained in each ink used in the present invention.

An ink jet recording liquid may be obtained by dispersing the pigment described above in an aqueous medium using a polymeric dispersing agent or a surfactant. As a dispersing agent for dispersing powder of such an organic pigment, a commonly used water-soluble resin or water-soluble surfactant can be used.

As a specific example of the water-soluble resin, there can be provided, for example, block copolymers, random copolymers, and salts thereof, which copolymers are obtained from at least two kinds of monomers selected from the group including styrene, styrene derivatives, vinylnaphthalene derivatives, aliphatic alcohol esters of α,β-ethylene unsaturated carboxylic acids, acrylic acid, acrylic acid derivatives, maleic acid, maleic acid derivatives, itaconic acid, itaconic acid derivatives, fumarate, and fumarate derivatives.

These water-soluble resins are alkali-soluble resins which are soluble in aqueous solution in which a base is dissolved, and among these, it is particularly preferable that the weight-average molecular weight thereof is 3,000-20,000, since an advantage can be obtained such that the viscosity of a dispersion liquid can be reduced and the dispersion is easily attained, in the case of use in an ink jet recording liquid.

Also, a combination of a polymeric dispersing agent and a self-dispersing pigment is preferable to obtain an appropriate dot diameter. The reason has not been necessarily clear but can be considered as follows.

The penetration into a recording paper sheet is suppressed by containing a polymeric dispersing agent. On the other hand, since aggregation of a self-dispersing pigment is suppressed by containing a polymeric dispersing agent, the self-dispersing pigment can spread smoothly in the horizontal directions. As a result, a dot spreads widely and thinly so that a desirable dot can be formed.

Also, as a specific example of a water-soluble surfactant which can be used as a dispersing agent, the following ones can be provided. For example, as an anionic surfactant, there can be provided, for example, higher fatty acid salts, alkyl sulfates, alkyl ether sulfates, alkyl ester sulfates, alkyl aryl ether sulfates, alkyl sulfonates, sulfosuccinates, alkyl allyl sulfonates, alkyl naphthalene sulfonates, alkyl phosphate, polyoxyethylene alkyl ether phosphates, and alkyl allyl ether phosphates. Also, as a cationic surfactant, there can be provided, for example, alkyl amine salts, dialkyl amine salts, tetraalkyl ammonium salts, benzalkonium salts, alkyl pyridinium salts, and imidazolinium salts.

Further, as an amphoteric surfactant, there can be provided, for example, dimethyl alkyl lauryl betaines, alkyl glycines, alkyl di(aminoethyl) glycines, and imidazolinium betaines. As a nonionic surfactant, there can be provided, for example, polyoxyethylene alkyl ethers, polyoxyethylene alkyl allyl ethers, polyoxyethylene polyoxypropylene glycol, glycerin esters, sorbitan esters, sucrose esters, polyoxyethylene ethers of glycerin esters, polyoxyethylene ethers of sorbitan esters, polyoxyethylene ethers of sorbitol esters, fatty acid alkanolamides, polyoxyethylene fatty acid amides, amine oxides, and polyoxyethylene alkylamines.

Also, the pigment can be coated with or microencapsulated by a resin having a hydrophilic group so as to provide it with dispersibility.

As a method for coating a water-insoluble pigment with or microencapsulating it by an organic polymer, any of the publicly known methods can be used. As a publicly known method, there can be provided, for example, chemically manufacturing methods, physically manufacturing methods, physically chemical methods, and mechanically manufacturing methods. Specifically, there can be provided, for example, an interfacial polymerization method, an in-situ polymerization method, a submerged cured coating method, a coacervation (phase separation) method, a submerged drying method, a melting-dispersion-cooling method, an aerial suspension coating method, a spray-drying method, an acid precipitation method, and a phase inversion emulsification method.

The interfacial polymerization method is a method such that two kinds of monomers or two kinds of reactants are separately dissolved in a dispersion phase and a continuous phase and both substances are reacted on the interface therebetween so as to form a wall film. The in-situ polymerization method is a method such that a liquid or gaseous monomer and a catalyst or two kinds of reactive substances are provided from either of the sides of a continuous phase and nuclear particles so as to cause reaction and to form a wall film. The submerged cured coating method is a method such that drops of a polymer solution containing particles of a core material is insolubilized by a curing agent, etc., in liquid so as to form a wall film.

The coacervation (phase separation) method is a method such that a polymer dispersion liquid in which particles of a core material are dispersed is separated into a coacervate (concentrated phase) with a high polymer concentration and a diluted phase so as to form a wall film. The submerged drying method is a method such that a liquid in which a core material is dispersed in a solution of a wall film material is prepared, the dispersion liquid is added into a liquid which is not miscible with a continuous phase of the dispersion liquid so as to obtain a complex emulsion, and a medium dissolving the water film material is gradually removed so as to form a wall film.

The melting-dispersion-cooling method is a method such that a wall film material which is melted into liquid by heating and solidified at ordinary temperature is heated and liquefied, particles of a core material are dispersed therein, they are made be fine particles, and cooling is performed to form a wall film. The aerial suspension coating method is a method such that particles of a core material are suspended as powder in gas by a fluidized bed and floated in gas stream while a coating liquid of a wall film material is sprayed and mixed therein so as to form a wall film.

The spray-drying method is a method such that a stock solution for capsulation is sprayed and contacted with hot wind so as to evaporate and dry a volatile component whereby a wall film is formed. The acid precipitation method is a method such that at least one of anionic groups of an organic polymeric compound containing the anionic groups is neutralized with a basic compound so as to provide the solubility to water, kneading is made with a coloring material in an aqueous medium, subsequently, neutralization or acidification is made with an acidic compound so as to precipitate organic compounds and fix them on the coloring material, and finally, neutralization and dispersion are made. The phase inversion emulsification method is a method such that while a mixture containing an anionic organic polymer having dispersibility in water and a coloring material is provided as a organic solvent phase, water is thrown into the organic solvent phase or the organic solvent phase is thrown into water.

As an organic polymer (resin) used for a material for constituting a wall film of a microcapsule, there can be provided, for example, polyamides, polyurethanes, polyesters, polyureas, epoxy resins, polycarbonates, urea resins, melamine resins, phenol resins, polysaccharides, gelatin, gum Arabic, dextran, casein, proteins, natural rubbers, carboxypolymethylene, polyvinyl alcohol, polyvinyl pyrrolidone, polyvinyl acetate, polyvinyl chloride, polyvinylidene chloride, cellulose, ethylcellulose, methylcellulose, nitrocellulose, hydroxyethylcellulose, cellulose acetate, polyethylene, polystyrene, homopolymers and copolymers of (meth)acrylic acid, homopolymers and copolymers of (meth)acrylates, (meth)acrylic acid-(meth)acrylate copolymer, styrene-(meth)acrylic acid copolymer, styrene-maleic acid copolymer, sodium alginate, fatty acids, paraffins, beeswax, water wax, hardened beef tallow, carnauba wax, and albumin.

Among these, organic polymers having an anionic group such as a carboxyl group or a sulfone group can be used. Also, as a nonionic organic polymer, there can be provided, for example, polyvinyl alcohol, polyethylene glycol monomethacrylate, polypropylene glycol monomethacrylate, methoxypolyethylene glycol monomethacrylate and copolymers thereof, and cationic ring-opening polymers of 2-oxazoline. Particularly, polyvinyl alcohol obtained through complete saponification has a low water-solubility and a property such that it is easily dissolved in hot water but is not easily dissolved in cold water, which is particularly preferable.

Also, the content of an organic polymer for constituting a wall film of a microcapsule is 1% by weight or more and 20% by weight or less of a water-insoluble coloring material such as organic pigments and carbon blacks. As the content of the organic polymer is in the range described above, the content of the organic polymer in the capsule is comparatively low and, therefore, the lowering of the coloring property of a pigment which is caused by coating the surface of the pigment with the organic polymer can be suppressed. If the content of the organic polymer is less than 1% by weight, it may be difficult to provide the effect of capsulation, and, on the other hand, if it is more than 20% by weight, the coloring property of the pigment may be significantly lowered. Further, as other properties thereof are taken into consideration, the content of the organic polymer is preferably in a range of 5-10% by weight of the water-insoluble coloring material.

That is, since a part of the coloring material is not coated but is substantially exposed, the lowering of the coloring property can be suppressed and, on the other hand, a part of the coloring material is not exposed but is substantially coated, the effect of coating the pigment is simultaneously provided. Also, the number-average molecular weight of the organic polymer is preferably 2,000 or greater from the viewpoint of the manufacture of a capsule. Herein, "being substantially exposed" does not mean a partial exposure associated with a defect such as a pinhole and a crack but means the condition of being positively exposed.

Further, when an organic pigment which is a self-dispersive pigment or a self-dispersive carbon black is used as a coloring material, even if the content of the organic polymer in the capsule is comparatively low, the dispersiblity of the pigment can be improved and, therefore, a sufficient storage stability can be obtained, which is more preferable for the present invention.

Additionally, it is preferable to select a suitable organic polymer depending on a method of microencapsulation. For example, for an interfacial polymerization method, polyesters, polyamides, polyurethanes, polyvinyl pyrrolidone, epoxy resins, etc., are suitable. For an in-situ polymerization method, homopolymers and copolymers of (meth)acrylates, (meth)acrylic acid-(meth)acrylate copolymers, styrene-(meth)acrylic acid copolymers, polyvinyl chloride, polyvinylidene chloride, polyamides, etc., are suitable. For a submerged cured coating method, sodium alginate, polyvinyl alcohol, gelatin, albumin, epoxy resins, etc., are preferable. For a coacervation method, gelatin, celluloses, casein, etc., are suitable. Of course, any of the publicly known encapsulation methods in addition to those described above can be also utilized for obtaining a fine and uniform microencapsulated pigment.

When a phase inversion method or an acid precipitation method is selected as a method of microcapsulation, an anionic organic polymer is used as an organic polymer for providing a wall film of a microcapsule. The phase inversion method is a method such that a complex of an anionic organic polymer having self-dispersibility or solubility in water and a coloring material such as a self-dispersive organic pigment or a self-dispersion-type carbon black or a mixture of the anionic organic polymer, a coloring material such as a self-dispersive organic pigment or a self-dispersion-type carbon black, and a curing agent is provided as an organic solvent phase and microcapsulation is conducted while self-dispersion (phase inversion emulsification) is caused by throwing water into the organic solvent phase or throwing the organic solvent phase into water. In the inversion phase method, it is not problematic to mix a vehicle for recording liquid or an additive into the organic solvent phase for the manufacture. Particularly, it is more preferable to mix a liquid medium for recording liquid since a dispersion liquid for recording liquid can be directly manufactured.

On the other hand, the acid precipitation method is a method such that a part of or all anionic groups in a water-containing cake obtained by a manufacturing method including a processes of neutralizing a part of or all anionic groups of an organic polymer containing the anionic groups with a basic compound, kneading it with a coloring material such as a self-dispersive organic pigment or a self-dispersion-type carbon black in aqueous medium, and to control the pH to neutral or acidic using an acidic compound to precipitate and fix the anionic group-containing organic polymer on the pigment, is neutralized using a basic compound, thereby conducting the microencapsulation. Thus, an aqueous dispersion liquid containing a fine anionic microencapsulated pigment containing much pigment can be manufactured.

Also, as a solvent used in the microencapsulation as described above, there can be provided, for example, alkylalcohols such as methanol, ethanol, propanol and butanol; aromatic hydrocarbons such as benzole, toluole and xylole; esters such as methyl acetate, ethyl acetate and butyl acetate; chlorinated hydrocarbons such as chloroform and ethylene dichloride; ketones such as acetone and isobutyl methyl ketone; ethers such as tetrahydrofuran and dioxane; and cellosolves such as methylcellosolve and butylcellosolve. Also, the microcapsules prepared by the method described above is once separated from the solvent by means of centrifugal separation, filtration, or the like and stirred and re-dispersed in water and necessary solvent so as to an objective recording liquid which can be used for the present invention. The average particle diameter of the encapsulated pigment obtained by a method as described above is preferably 50 nm-180 nm.

Thus, the pigment adheres to an object to be printed due to such a resin coating so that the rubbing resistance of the object to be printed can be improved.

[Dyes]

As a dye used for recording liquid, dyes classified in acidic dyes, direct dyes, basic dyes, reactive dyes and food colors in color indices and having excellent water resistance and light fastness are used. Plural kinds of these dyes may be mixed and used or, if necessary, may be mixed and used with another color material such as a pigment. Such a coloring agent is added in a range such that the effect of the present invention is not inhibited.

(a) As acidic dyes and food colors, for example,
- C.I. acid yellows 17, 23, 42, 44, 79, and 142,
- C.I. acid reds 1, 8, 13, 14, 18, 26, 27, 35, 37, 42, 52, 82, 87, 89, 92, 97, 106, 111, 114, 115, 134, 186, 249, 254, and 289,
- C.I. acid blues 9, 29, 45, 92, and 249,
- C.I. acid blacks 1, 2, 7, 24, 26, and 94,
- C.I. food yellows 3 and 4,
- C.I. food reds 7, 9, and 14, and
- C.I. food blacks 1 and 2, can be used.

(b) As direct dyes, for example,
- C.I. direct yellows 1, 12, 24, 26, 33, 44, 50, 86, 120, 132, 142, and 144,
- C.I. direct reds 1, 4, 9, 13, 17, 20, 28, 31, 39, 80, 81, 83, 89, 225, and 227,
- C.I. direct oranges 26, 29, 62, and 102,
- C.I. direct blues 1, 2, 6, 15, 22, 25, 71, 76, 79, 86, 87, 90, 98, 163, 165, 199, and 202, and
- C.I. direct blacks 19, 22, 32, 38, 51, 56, 71, 74, 75, 77, 154, 168, and 171, can be used.

(C) As basic dyes, for example,
- C.I. basic yellows 1, 2, 11, 13, 14, 15, 19, 21, 23, 24, 25, 28, 29, 32, 36, 40, 41, 45, 49, 51, 53, 63, 64, 65, 67, 70, 73, 77, 87, and 91,
- C.I. basic reds 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112,
- C.I. basic blues 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155, and
- C.I. basic blacks 2 and 8, can be used.

(d) As reactive dyes, for example,
- C.I. reactive blacks 3, 4, 7, 11, 12, and 17,
- C.I. reactive yellows 1, 5, 11, 13, 14, 20, 21, 22, 25, 40, 47, 51, 55, 65, and 67,
- C.I. reactive reds 1, 14, 17, 25, 26, 32, 37, 44, 46, 55, 60, 66, 74, 79, 96, and 97, and
- C.I. reactive blues 1, 2, 7, 14, 15, 23, 32, 35, 38, 41, 63, 80, and 95, can be used.

[Additives and Physical Properties Common to Pigments and Dyes]

It is preferable to use a water-soluble organic solvent as well as a coloring material for the purposes of providing recording liquid used for an image forming apparatus according to the present invention with a desired physical property or preventing clogging in a nozzle of a recording head which is caused by the drying of the recording liquid. The water-soluble organic solvent may include a wetting agent or a penetrating agent. The wetting agent is added for the purpose of preventing clogging in a nozzle of a recording head which is caused by the drying of the recording liquid.

Specific examples of the wetting agents are polyhydric alcohols such as ethylene glycol, diethylene glycol, triethylene glycol, tetraethylene glycol, polyethylene glycol, propylene glycol, 1,3-butanediol, 1,3-propanediol, 2-methyl-1,3-propanediol, 1,4-butanediol, 1,5-pentanediol, 1,6-hexanediol, glycerin, 1,2,6-hexanetriol, 2-ethyl-1,3-hexanediol, 1,2,4-butanetriol, 1,2,3-butanetriol, and petriols; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monomethyl ether, and propylene glycol monoethyl ether; polyhydric alcohol aryl ethers such as ethylene glycol monophenyl ether and ethylene glycol monobenzyl ether; nitrogen-containing heterocyclic compounds such as N-methyl-2-pyrrolidone, N-hydroxyethyl-2-pyrrolidone, 2-pyrrolidone, 1,3-dimethylimidazolidinone, and ε-caprolactam; amides such as formamide, N-methylformamide, and N,N-dimethylformamide; amines such as monoethanolamine, diethanolamine, triethanolamine, monoethylamine, diethylamine, and triethylamine; sulfur-containing compounds such as dimethyl sulfoxide, sulfolane, and thiodiethanol; propylene carbonate, ethylene carbonate, and γ-butyrolactone. These solvents are used singularly or in combination with water.

Also, the penetrating agent is added for the purpose of improving the wettability of a material to be recorded with recording liquid and adjusting the penetration speed thereof. As a penetrating agent, penetrating agents represented by the following formulas (I)-(IV) are preferable. That is, since a polyoxyethylene alkylphenyl ether-type surfactant of the following formula (I), a acetylene glycol-type surfactant of the following formula (II), a polyoxyethylene alkyl ether-type surfactant of the following formula (III) and polyoxyethylene polyoxypropylene alkyl ether-type surfactant of the following formula (IV) can lower the surface tension of liquid, the wettability can be improved and the penetration speed can be increased.

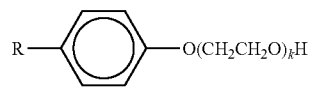
(I)

(R is a hydrocarbon chain with 6-14 carbon atoms which may be branched and k is 5-20.)

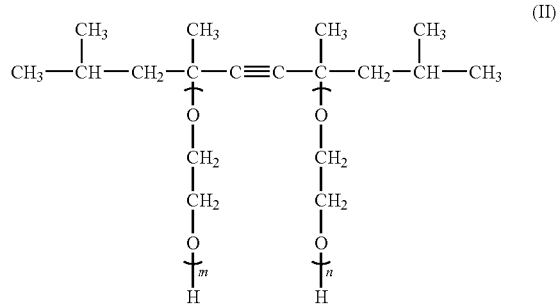
(II)

(Each of m and n is 0-40.)

(III)

(R is a hydrocarbon chain with 6-14 carbon atoms which may be branched and k is 5-20.)

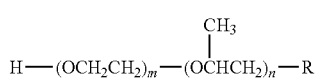
(IV)

(R is a hydrocarbon chain with 6-14 carbon atoms and each of m and n is a number equal to or less than 20.)

In addition to the compounds of the formulas (I)-(IV), there can be used, for example, polyhydric alcohol alkyl or aryl ethers such as diethylene glycol monophenyl ether, ethylene glycol monophenyl ether, ethylene glycol monoallyl ether, diethylene glycol monobutyl ether, propylene glycol monobutyl ether, and tetraethylene glycol chlorophenyl ether; nonionic surfactants such as a polyoxyethylene polyoxypropylene block copolymer, fluorine-containing surfactants, and lower alcohols such as ethanol and 2-propanol, and diethylene glycol monobutyl ether is particularly preferable.

However, the surfactant is not particularly limited and can be appropriately selected depending on the purpose, and, for example, there can be provided anionic surfactants, nonionic surfactants, amphoteric surfactants, and fluorinated surfactants.

As an anionic surfactant, there can be provided, for example, polyoxyethylene alkyl ether acetates, dodecylbenzenesulfonates, laurylates, and polyoxyethylene alkyl ether sulfates.

As a nonionic surfactant, there can be provided, for example, acetylene glycol-type surfactants, polyoxyethylene alkyl ethers, polyoxyethylene alkylphenyl ethers, polyoxyethylene alkyl esters, and polyoxyethylene sorbitan fatty acid esters.

As an acetylene glycol-type surfactant, there can be provided, for example, 2,4,7,9-tetramethyl-5-decyne-4,7-diol, 3,6-dimethyl-4-octyne-3,6-diol, and 3,5-dimethyl-1-hexyne-3-ol. For the acetylene glycol-type surfactant, there can be provided, for example, Surfynol 104, 82, 465, 485, and TG (available from Air Products and Chemicals, Inc.) as commercial products.

As an amphoteric surfactant, there can be provided, for example, lauryl aminopropionate, lauryl dimethyl betaine, stearyl dimethyl betaine, and lauryl dihydroxyethyl betaine. In addition, there can be provided, for example, lauryldimethylamineoxide, myristyldimethylamineoxide, stearyldimethylamineoxide, dihydroxyethyllaurylamineoxide, polyoxyethylene coconut oil alkyldimethylamineoxide, dimethylalkyl (coconut) betaine, and dimethyl lauryl betaine.

Among these surfactants, surfactants represented by the following chemical formulas (V), (VI), (VII), (VIII), (IX), and (X) are preferable.

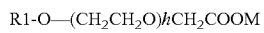
(V)

In chemical formula (V), R1 is an alkyl group with 6-14 carbon atoms which may be branched. h is an integer of 3-12. M is selected from alkali metal ions, quaternary ammonium ions, quaternary phosphonium ions, and alkanolamines.

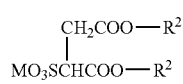
(VI)

In chemical formula (VI), $R^2$ is an alkyl group with 5-16 carbon atoms which may be branched. M is selected from alkali metal ions, quaternary ammonium ions, quaternary phosphonium ions, and alkanolamines.

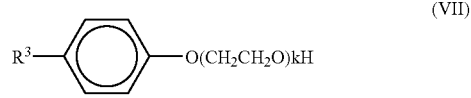
(VII)

In chemical formula (VII), $R^3$ is a hydrocarbon group such as alkyl groups with 6-14 carbon atoms which may be branched. k is an integer of 5-20.

(VIII)

In chemical formula (VIII), R4 is a hydrocarbon group such as alkyl groups with 6-14 carbon atoms. j is an integer of 5-20.

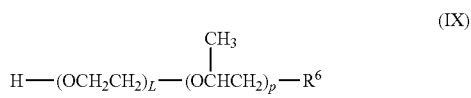
(IX)

In chemical formula (IX), $R^6$ is a hydrocarbon group such as alkyl groups with 6-14 carbon atoms which may be branched. Each of L and p is independently an integer of 1-20.

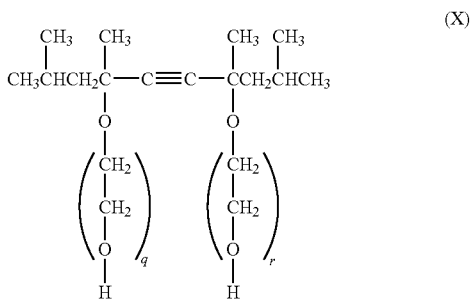
(X)

In chemical formula (X), each of q and r is independently an integer of 0-40.

The surfactants represented by chemical formulas (V) and (VI) shown above are specifically provided in the form of a free acid, below. First, as a surfactant of (V), the following ones represented by (V-1) to (V-6) can be provided.

(V-1)

(V-2)

(V-3)

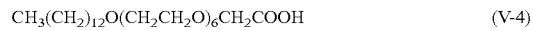
(V-4)

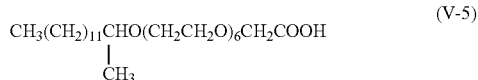
(V-5)

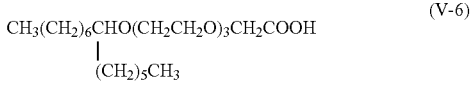
(V-6)

Next, as a surfactant of (VI), the following ones represented by (VI-1) to (VI-4) can be provided.

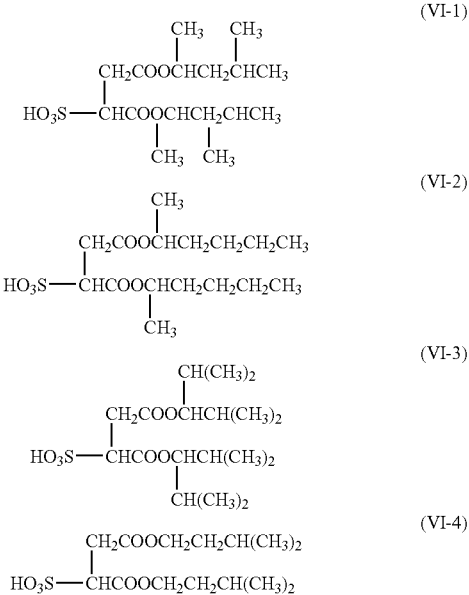

As a fluorinated surfactant, one represented by the following chemical formula (A) is preferable.

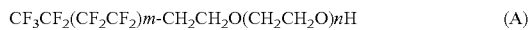

CF$_3$CF$_2$(CF$_2$CF$_2$)$m$-CH$_2$CH$_2$O(CH$_2$CH$_2$O)$n$H   (A)

In chemical formula (A), m is an integer of 0-10, and n is an integer of 1-40.

As a fluorinated surfactant, there can be provided, for example, perfluoroalkyl sulfonic acid compounds, perfluoroalkyl carboxylic acid compounds, perfluoroalkyl phosphate compounds, perfluoroalkyl ethyleneoxide compounds, and polyoxyalkylene ether polymers having a perfluoroalkyl ether group as a side chain. Among these, a polyoxyalkylene ether polymers having a perfluoroalkyl ether group as a side chain has a low foamability and a low fluorine compound bioaccumulation potential, which is recently considered problematic, and is therefore safety, which is particularly preferable.

As a perfluoroalkyl sulfonic acid compound, there can be provided, for example, perfluoroalkyl sulfonic acids and perfluoroalkyl sulfonates.

As a perfluoroalkyl carboxylic acid compound, there can be provided, for example, perfluoroalkyl carboxylic acids and perfluoroalkyl carboxylates.

Also, as a perfluoroalkyl phosphate compound, there can be provided, for example, esters derived from perfluoroalkyl phosphoric acids and salts of esters of perfluoroalkyl phosphoric acids.

As a polyoxyalkylene ether polymers having a perfluoroalkyl ether group as a side chain, there can be provided, for example, polyoxyalkylene ether polymers having a perfluoroalkyl ether group as a side chain, sulfates of polyoxyalkylene ether polymers having a perfluoroalkyl ether group as a side chain, and salts of a polyoxyalkylene ether polymers having a perfluoroalkyl ether group as a side chain.

As a counter ion of a salt in the fluorinated surfactants described above, there can be provided, for example, Li, Na, K, NH$_4$, NH$_3$CH$_2$CH$_2$OH, NH$_2$(CH$_2$CH$_2$OH)$_2$, and NH(CH$_2$CH$_2$OH)$_3$.

The fluorinated surfactant may be appropriately synthesized and used or a commercial product may be used.

As a commercial product thereof, there can be provided, for example, Surflon S-111, S-112, S-113, S-121, S-131, S-132, S-141, and S-145 (available from Asahi Glass Co., Ltd.); Fluorad FC-93, FC-95, FC-98, FC-129, FC-135, FC-170C, FC-430, and FC-431 (available from Sumitomo 3M Limited); Megafac F-470, F1405, and F-474 (available from Dainippon Ink and Chemicals, Incorporated); Zonyl TBS, FSP, FSA, FSN-100, FSN, FSO-100, FSO, FS-300, UR (available from DuPont); FT-110, FT-250, FT-251, FT-400S, FT-150, FT-400SW (available from NEOS Co. Ltd.); and PF-151N (available from Omnova Solutions, Inc.). Among these, Zonyl FSN, FSO-100, and FSO (available from DuPont) are particularly preferable in terms of high reliability and good color development.

Other components are not particularly limited and can be appropriately selected according to need, and there can be provided, for example, resin emulsions, pH adjustors, antiseptics or fungicides, rust inhibitors, antioxidants, ultraviolet ray absorbers, oxygen absorbers, and light stabilizers.

A resin emulsion is obtained by dispersing a resin fine particle in water as a continuous phase and may contain a dispersing agent such as a surfactant according to need.

Generally, it is preferable that the content of a resin fine particle as a dispersed phase component (the content of a resin fine particle in a resin emulsion) is 10-70% by mass. Also, in regard to the particle diameter of the resin fine particle, the average particle diameter is preferably 10-1,000 nm, and more preferably 20-300 nm, particularly, by taking use in an ink jet recording apparatus into consideration.

The material of the resin fine particle in the dispersed phase is not particularly limited and can be appropriately selected according to the purpose, and there can be provided, for example, acrylic resins, vinyl acetate resins, styrene resins, butadiene resins, styrene-butadiene resins, vinyl chloride resins, acryl-styrene resins, and acryl silicone resins. Among these, acryl silicone resins are particularly preferable.

The resin emulsion may be appropriately synthesized and used or a commercial product may be used.

As a commercially available resin emulsion, there can be provided, for example, Microgel E-1002, E-5002 (styrene-acryl resin emulsions, available from Nippon Paint Co., Ltd.); VONCOAT 4001 (an acrylic resin emulsion, available from Dainippon Ink and Chemicals, Incorporated); VONCOAT 5454 (a styrene-acryl resin emulsion, available from Dainippon Ink and Chemicals, Incorporated); SAE-1014 (a styrene-acryl resin emulsion, available from ZEON Corporation); Saibinol SK-200 (an acrylic resin emulsion, available from Saiden Chemical Industry Co., Ltd.); Primal AC-22, AC-61 (acrylic resin emulsions, available from Rohm and Haas Company); Nanocryl SBCX-2821, 3689 (acryl silicone resin emulsions, available from Toyo Ink Mfg. Co., Ltd.); and #3070 (a methyl methacrylate polymer resin emulsion, available from Mikuni Color Ltd.).

The content of the added resin fine particle component in a resin emulsion in the ink is preferably 0.1-50% by mass, more preferably 0.5-20% by mass, and further preferably 1-10% by mass. If the content is less than 0.1% by mass, the effect of improving the resistance to clogging and the ejection stability may not be sufficient, and if it is greater than 50% by mass, the preservation stability of the ink may be degraded.

The surface tension of a recording liquid used in an image forming apparatus according to the present invention is preferably 10-60 N/m, and more preferably 15-40 N/m from the viewpoint of satisfaction of both the wettability against a recording medium and the formation of a liquid drop particle.

Similarly, the viscosity of a recording liquid is preferably in a range of 1.0-30 mPa·s, and more preferably in a range of 5.0-10.0 mPa·s from the viewpoint of the ejection stability.

Also, the pH of the recording liquid is preferably in a range of 3-11, and more preferably in a range of 6-10 from the viewpoint of the corrosion prevention for a metal part which contacts the liquid.

Also, an antiseptic or a fungicide can be contained in the recording liquid, whereby the growth of bacteria can be suppressed and the preservation stability and image quality stability thereof can be improved. As an antiseptic and fungicide, there can be used, for example, benzotriazole, sodium dehydroacetate, sodium sorbate, 2-pyridinethiol-1-oxide, isothiazolin-based compounds, sodium benzoate, and sodium pentachlorophenolate.

Also, a rust inhibitor can be contained in the recording liquid, whereby a coating can be formed on a metal surface of the head, etc., which contacts the liquid, so as to prevent the corrosion thereof. As a rust inhibitor, there can be used, for example, acidic sulfites, sodium thiosulfate, thiodiglycolic acid ammonium, diisopropyl ammonium nitrite, pentaerythritol tetranitrate, and dicyclohexyl ammonium nitrite.

Also, an antioxidant can be contained in the recording liquid, whereby the antioxidant can quench radical species which can cause corrosion and prevent the corrosion even when the radical species are generated.

As an antioxidant, phenolic compounds and amine compounds are representative. As a phenolic compound, there can be provided, for example, compounds such as hydroquinone and gallates; and hindered phenolic compounds such as 2,6-di-tert-butyl-p-cresol, stearyl β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-thiobis(3-methyl-6-tert-butylphenol), 1,1,3-tris(2-methyl-4-hydroxy-5-tert-butylphenyl)butane, 1,3,5-trimethyl-2,4,6-tris(3,5-di-tert-4-hydroxybenzyl)benzene, tris(3,5-dit-tert-butyl-4-hydroxybenzyl)isocyanurate, and tetrakis [methylene-3-(3',5'-di-tert-butyl-4-hydroxyphenyl) propionate]methane. As an amine compound, there can be provided, for example, N,N'-diphenyl-p-phenylenediamine, phenyl-β-naphthylamine, phenyl-α-naphthylamine, N,N'-β-naphthyl-p-phenylenediamine, N,N'-diphenylethylenediamine, phenothiazine, N,N'-di-sec-butyl-p-phenylenediamine, and 4,4'-tetramethyl-diaminodiphenylmethane. Also, for the latter, sulfur-containing compounds and phosphorus-containing compounds are representative. As a sulfur-containing compound, there can be provided, for example, dilauryl thiodipropionate, distearyl thiodipropionate, lauryl stearyl thiodipropionate, dimyristyl thiodipropionate, distearyl β,β'-thiodibutyrate, 2-mercaptobenzoimidazole, and dilauryl sulfide. As a phosphorus-containing compound, there can be provided, for example, triphenyl phosphite, trioctadecyl phosphite, tridecyl phosphite, trilauryl trithiophosphite, diphenyl isodecyl phosphite, trinonyl phenyl phosphite, and distearyl pentaerythritol phosphite.

As a pH adjuster contained in the recording liquid, there can be used, for example, hydroxides of alkali metals such as lithium hydroxide, sodium hydroxide, and potassium hydroxide; ammonium hydroxide; quaternary ammonium hydroxides; quaternary phosphonium hydroxides; carbonates of alkali metals such as lithium carbonate, sodium carbonate, and potassium carbonate; amines such as diethanolamine and triethanolamine; boric acid; hydrochloric acid; nitric acid; sulfuric acid; and acetic acid.

As an ultraviolet-ray absorber, there can be provided, for example, benzophenone-based ultraviolet-ray absorbers, benzotriazole-based ultraviolet-ray absorbers, salicylate-type ultraviolet-ray absorbers, cyanoacrylate-type ultraviolet-ray absorbers, and nickel complex-based ultraviolet-ray absorbers.

As a benzophenone-based ultraviolet-ray absorber, there can be provided, for example, 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

As a benzotriazole-based ultraviolet-ray absorber, there can be provided, for example, 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

As a salicylate-type ultraviolet-ray absorber, there can be provided, for example, phenyl salicylate, p-tert-butylphenyl salicylate, and p-octylphenyl salicylate.

As a cyanoacrylate-type ultraviolet-ray absorber, there can be provided, for example, ethyl 2-cyano-3,3'-diphenylacrylate, methyl 2-cyano-3-methyl-3-(p-methoxyphenyl)acrylate, and butyl 2-cyano-3-methyl-3-(p-methoxyphenyl)acrylate.

As a nickel complex-type ultraviolet-ray absorber, there can be provided, for example, nickel bis(octylphenyl)sulfide, 2,2'-thiobis(4-tert-octylphalate)-n-butylamine nickel(II), 2,2'-thiobis(4-tert-octylphalate)-2-ethylhexylamine nickel (II), and 2,2'-thiobis(4-tert-octylphalate)triethanolamine nickel(II).

An ink in an ink media set according to the present invention is manufactured by dissolving or dispersing, at least, water, a coloring agent, and a wetting agent, and a penetrating agent and a surfactant according to need, and further another component according to need in an aqueous medium and further stirring and mixing them according to need. The dispersion can be attained by using, for example, a sand mill, a homogenizer, a ball mill, a paint shaker, or an ultrasound dispersing machine and the stirring and mixing can be attained by an usual stirring machine having a stirring blade, a magnetic stirrer, or a high-speed dispersing machine.

The color of ink is not particularly limited and can be appropriately selected according to the purpose, and there can be provided, for example, yellow, magenta, cyan, and black. When an ink set in which at least two kinds of the colors are used in combination is used to perform recording, a multi-color image can be formed, and when an ink set in which all the colors are used in combination is used to perform recording, a full-color image can be formed.

In thus configured image forming apparatus, the paper sheets 112 are fed and separated one by one from the paper feeding part, and the paper sheet 112 fed approximately vertically and upward is guided by the guide 115 and conveyed into the space between the conveyor belt 121 and the counter roller 122. Further, the leading edge of the paper sheet 112 is guided by the conveying guide 123 and pressed by the leading edge pressing roller 125 against the conveyor belt 121, and the conveyance direction of it is changed by approximately 90°.

Then, an alternating voltage such that a positive output and a negative output are alternately repeated is applied to the charging roller 126 from an AC bias applying part by a control circuit which is not shown in the figures and the conveyer belt 121 is charged with an alternating charging voltage pattern, that is, with positively and negatively charged strips with a constant width alternately in the sub-scanning direction which is a rotational direction thereof. When the paper sheet 112 is fed onto and conveyed on the conveyor belt 121 which is positively and negatively charged alternately, the paper sheet 112 is attracted to the conveyor belt 121 by an electrostatic force and the paper sheet 112 is conveyed in the sub-scanning direction according to the rotational movement of the conveyor belt 121.

Then, the recording head 107 is driven according to an image signal while the carriage 103 is moved in the forward and backward directions, and an ink drop is ejected onto the stopping paper sheet 112 to record one line of image. After the paper sheet 112 is conveyed by a specified distance, the next line is recorded. When a recording completion signal or a signal indicating that the bottom edge of the paper sheet 112 has reached an image forming area is received, the recording operation is completed and the paper sheet 112 is ejected onto the ejected paper tray 154.

In the case of double-face printing, when front face (first printing face) recording is completed, the recorded paper sheet 112 is sent into a double-face paper feeding unit 155 by counter-rotating the conveyor belt 121, and the paper sheet 112 is reversed (such that the back face thereof is a face to be printed) and fed into the space between the counter roller 122 and the conveyer belt 121 again. After it is conveyed on the conveyer belt 121 similarly to as described above and recording is performed on the back face by timing control, it is ejected on the ejected paper tray 154.

Also, during standby for printing (recording), the carriage 103 is moved to the side of the maintenance and refreshing mechanism 155 and the nozzle face of the recording head 107 is capped by the cap 157, whereby the nozzle is kept at a wetting condition and ejection failure caused by dried ink is prevented. Also, while the recording head 107 is capped by the cap 157, recording liquid is suctioned by the nozzle (which is called as "nozzle suction" or "head suction") and a refreshing operation to eliminate thickened recording liquid or air bubbles is conducted. Then, wiping is conducted by using the wiper blade 158 in order to wipe off or remove the ink adhering to the nozzle face of the recording head 107 during the refreshing operation. Also, before or during the recording, blank ejection operation for ejecting ink which is not associated with the recording is conducted. Thereby, the stable ejection performance of the recording head 107 is maintained.

Thus, in the image forming apparatus including the device for ejecting a liquid drop, since the recording head composed of the liquid ejecting head according to the present invention is included, a high quality image can be formed.

Herein, when the used recording liquid is a dye-containing ink in which a dye is used as a coloring material, the temperature for heat treatment to form an ink-resistant liquid contact film tends to be higher, but, since thallium is contained, the heat shrinkage caused by the heat treatment hardly occurs and a component of the head can be formed with a good precision of a dimension thereof. Also, in the case of a pigment-containing ink in which a pigment is used as a coloring agent, since the temperature for heat treatment to form an ink-resistant liquid contact film tends to be lower than the case where a dye-containing ink is used, the heat shrinkage caused by the heat treatment further hardly occurs and a component of the head can be formed with a good precision of a dimension thereof.

Furthermore, in the case of an ink containing a pigment coated with a resin, since no heat treatment process for forming an ink-resistant liquid contact film is required, no heat shrinkage occurs and a component of the head can be formed with a good precision of a dimension thereof. Also, when benzotriazole as a rust inhibitor is contained in an ink, the temperature for heat treatment to form an ink-resistant liquid contact film can be lowered and a component of the head can be formed with a good precision of a dimension thereof.

Figure 10:
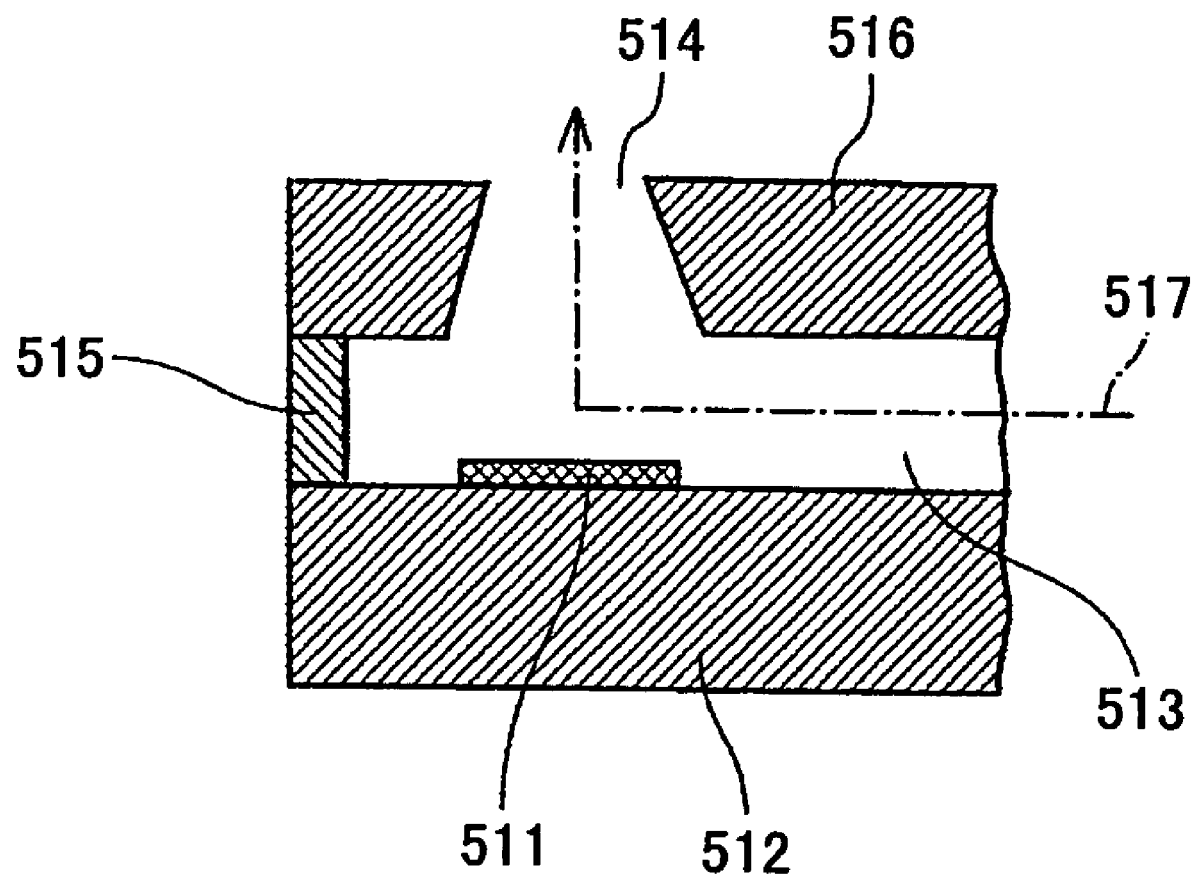
FIG. 10 is a cross-sectional diagram illustrating another example of a liquid ejecting head according to the present invention.

Next, as a liquid ejecting head, example of a thermal-type head is described with reference to FIG. 10, which is a side-shooter-type head whose liquid drop ejecting direction is different from the directions of the flow channel for recording liquid (liquid chamber) and which head is similar to the liquid ejecting head of the aforementioned embodiment, but a device for generating energy to eject a liquid drop (driving element) is an electro-thermal converter.

The liquid ejecting head is constructed by stacking a flow channel forming member 515 constituting a side wall for a flow channel 513 on a substrate 512 having an ejection energy generator 511 (in which electrodes for applying an ejection signal to the generator and a protective layer provided on the generator according to need are omitted) and stacking a nozzle plate 516 on which a nozzle 514 is formed, on the flow channel forming member 515. In this head, the direction of ink flow to the ejection energy acting part in the flow channel 513 is perpendicular to the central axis of the opening of the nozzle 514, as shown by a dashed line 517.

By employing a head with such a configuration, energy generated from the ejection energy generator 511 can be more efficiently converted into kinetic energy for the formation of an ink drop and the traveling thereof. Also, there is a structural advantage of high-speed recovery of the meniscus of ink by supply of ink and it is particularly effective when a heater element is used for the ejection energy generator. Also, the side shooter-type one can avoid so-called cavitation phenomenon, such that an ejection energy generator is gradually destroyed by a shock caused by decay of air bubbles, which is problematic in an edge shooter. That is, in the side-shooter type one, if an air bubble develops and the air bubble reaches the nozzle, the air bubble communicates with atmosphere and no shrinkage of the air bubble is caused by temperature drop, so that the lifetime of the head can be relatively long.

Even in the head having no vibrating plate such as this liquid ejecting head, the embrittlement and heat shrinkage in the heat treatment process can be reduced by applying the present invention to a nozzle plate, a flow channel plate, etc., so as to obtain a liquid ejecting head with a high precision.

Additionally, although the aforementioned embodiment of the present invention has been described with respect to an example such that the present invention is applied to an image forming apparatus configured as a printer, but the present invention is not limited to this embodiment and can be also applied to, for example, another image forming apparatus such as a printer/facsimile/copia multi-function processing machine. Also, the present invention can be applied to an image forming apparatus using, for example, another recording liquid which is liquid except ink or fixation treatment liquid.

Next, a recording method according to the present invention is described. In the recording method according to the present invention, an image is recorded on a recording medium (paper sheet) by ejecting a liquid drop from the liquid ejecting head according to the present invention, as in the image forming apparatus described above.

Now, first, the relationship among a nozzle plate of a liquid ejecting head according to the present invention, recording liquid (herein, ink) and a recording medium (called a medium) is described. As described above, the nozzle plate of the liquid ejecting head according to the present invention is excellent in water repellency and ink repellency and, therefore, can form an ink drop (a particle) well, even when an ink with a low surface tension is used. This is because the nozzle plate is not excessively wetted and the meniscus of ink is formed normally. As the meniscus is formed normally, ink is prevented from being drawn to one side when the ink is ejected, and, consequently, bending of an ink stream can be reduced and an image can be obtained with a high accuracy of a dot position.

When printing is made on a paper sheet (medium) with a low absorbency, the degree of the positional accuracy of a dot significantly affects an image quality. That is, since ink does not smoothly spread on a paper sheet with a low absorbency, an area with no filled ink, namely, a blank portion is formed even if the positional accuracy of a dot is only slightly lowered. This area with no filled ink causes the irregularity or decrease of the image density, which leads to the degradation of the image quality.

However, in a nozzle plate of the liquid ejecting head according to the present invention, since the positional accuracy of a dot is high even if an ink with low surface tension is used, the ink can be filled in a paper sheet even when a paper sheet with low absorbency is used, whereby the irregularity or decrease of the density of an image is not caused and a print with a high image quality can be obtained.

A recording medium (medium for recording) used in the recording method according to the present invention is described below.

The recording medium includes a supporter and a coating layer on at least one surface of the supporter, and further includes another layer according to need.

As a medium for recording, the amount of ink as recording liquid transferred into a used medium for recording for contact time of 100 ms, which amount is measured by a dynamic scanning absorptometer, is 2-40 ml/m$^2$, and more preferably 3-30 ml/m$^2$. Similarly, the amount of pure water transferred into a used medium for recording for contact time of 100 ms, which amount is measured by a dynamic scanning absorptometer, is preferably 2-45 ml/m$^2$, and more preferably 3-30 ml/m$^2$. In regard to a medium for recording, if the amount of transferred pure ink or water for contact time of 100 ms is too small, beading may easily occur, and if it is too large, the diameter of a recorded ink dot may be excessively smaller than a desired diameter.

Also, as a medium for recording, the amount of ink transferred into a used medium for recording for contact time of 400 ms, which amount is measured by a dynamic scanning absorptometer, is 3-50 ml/m$^2$, and more preferably 4-40 ml/m$^2$. Similarly, the amount of pure water transferred into a used medium for recording for contact time of 400 ms, which amount is measured by a dynamic scanning absorptometer, is preferably 3-50 ml/m$^2$, and more preferably 4-40 ml/m$^2$. In regard to a medium for recording, if the amount of transferred one for contact time of 400 ms is too small, the drying property thereof may be insufficient and a spur mark may be created, and if it is too large, bleeding may easily occur and the glossiness of an image portion after drying may be low.

Herein, the dynamic scanning absorptometer (DSA: JAPAN TAPPI JOURNAL, Volume 48, May 1994, pp. 88-92, Shigenori Kuga) is an apparatus which can accurately measure the amount of a liquid absorbed during a very short period of time. The dynamic scanning absorptometer performs an automatic measurement by directly reading the speed of liquid absorption based on the movement of the meniscus thereof in a capillary, shaping a sample into a disc, spirally scanning it with an liquid-absorbing head, and automatically controlling the scanning speed in accordance with a predetermined pattern so as to conduct the measurement with respect to the necessary number of point(s) on one sample. A liquid supplying head for supplying liquid onto a paper sample is connected via a Teflon (registered trademark) tube to the capillary, and the position of the meniscus in the capillary is automatically detected by an optical sensor. Specifically, a dynamic scanning absorptometer (K350 series, type D, available from Kyowa Co., Ltd.) was used to measure the amount of transferred pure water or ink. The amount of transferred one for contact time of 100 ms or 400 ms is obtained by interpolating measurement values of transfer amounts measured for contact time periods around each contact time. The measurement was performed at 23° C. and 50% RH.

<Supporter>

Various materials may be used for the base material depending on the purpose of paper. For example, a sheet of paper mainly made of wood fibers and a nonwoven fabric mainly made of wood and synthetic fibers may be used.

A sheet of paper may be made of wood pulp or recycled pulp. Examples of wood pulp are leaf bleached kraft pulp (LBKP), needle bleached kraft pulp (NBKP), NBSP, LBSP, GP, and TMP.

As materials of recycled pulp, recycled papers in the list of standard qualities of recycled papers of the Paper Recycling Promotion Center may be used. For example, chemical pulp or high-yield pulp made of recycled papers may be used as the base material. Such recycled papers include printer papers such as non-coated computer paper, thermal paper, and pressure-sensitive paper; OA papers such as plain paper; coated papers such as art paper, ultra-lightweight coated paper, and matt paper; and non-coated papers such as bond paper, color bond paper, note paper, letter paper, warpping paper, fancy paper, medium quality paper, newspaper, woody paper, supermarket flyers, simili paper, pure-white roll paper, and milk cartons. The above materials may be used individually or in combination.

Normally, recycled pulp is made by the following four steps:

(1) A defibrating step of breaking down used paper into fibers and separating ink from the fibers by using a mechanical force and a chemical in a pulper.

(2) A dust removing step of removing foreign substances (such as plastic) and dust in the used paper by using, for example, a screen and a cleaner.

(3) A deinking step of expelling the ink separated by a surfactant from the fibers by using a flotation method or a cleaning method.

(4) A bleaching method of bleaching the fibers by oxidization or reduction.

When mixing recycled pulp with wood pulp, the percentage of recycled pulp is preferably 40% or lower so that produced paper does not curl after recording.

As an internal filler for the base material, a conventional white pigment may be used. For example, the following substances may be used as a white pigment: an inorganic pigment such as precipitated calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithophone, zeolite, magnesium carbonate, or magnesium hydrate; and an organic pigment such as styrene plastic pigment, acrylic plastic pigment, polyethylene, microcapsule, urea resin, or melamine resin. The above substances may be used individually or in combination.

As an internal sizing agent used when producing the base material, a neutral rosin size used for neutral papermaking, alkenyl succinic anhydride (ASA), alkyl ketene dimer (AKD), or a petroleum resin size may be used. Especially, a neutral rosin size and alkenyl succinic anhydride are preferable. Alkyl ketene dimer has a high sizing effect and therefore provides an enough sizing effect with a small amount. However, since alkyl ketene dimer reduces the friction coefficient of the surface of recording paper (medium), recording paper made using alkyl ketene dimer may cause a slip when being conveyed in an ink jet recording apparatus.

<Coating Layer>

The coating layer contains a pigment and a binder, and may also contain a surfactant and other components.

As a pigment, an inorganic pigment or a mixture of an inorganic pigment and an organic pigment may be used.

For example, kaolin, talc, heavy calcium carbonate, precipitated calcium carbonate, calcium sulfite, amorphous silica, alumina, titanium white, magnesium carbonate, titanium dioxide, aluminum hydroxide, calcium hydrate, magnesium hydrate, zinc hydroxide, or chlorite may be used as an inorganic pigment. Especially, kaolin provides a high gloss surface similar to that of an offset paper and is therefore preferable.

There are several types of kaolin, for example, delaminated kaolin, calcined kaolin, and engineered kaolin made by surface modification. To provide a high gloss surface, the mass percentage of a type of kaolin, in which 80 or more mass percent of particles have a diameter of 2 μm or smaller, in the total amount of kaolin is preferably 50 percent or more.

The mass ratio of the binder to kaolin in the coating layer is preferably 100:50. If the mass ratio of kaolin is lower than 50, sufficient glossiness may not be obtained. There is no specific limit to the amount of kaolin. However, when the fluidity and the thickening property of kaolin under a high shearing force are taken into account, the mass ratio of kaolin is preferably 90 or lower in terms of coatability.

As an organic pigment, a water-soluble dispersion of, for example, styrene-acrylic copolymer particles, styrene-butadiene copolymer particles, polystyrene particles, or polyethylene particles may be used. The above organic pigments may be used in combination.

The amount of an organic pigment in the total amount of pigment in the coating layer is preferably 2-20 mass percent. An organic pigment as described above has a specific gravity lower than that of an inorganic pigment and therefore provides a thick, high-gloss coating layer having a good coatability. If the mass percentage of an organic pigment is less than 2 percent, a desired effect is not obtained. If the mass percentage of an organic pigment is more than 20 percent, the fluidity of a coating liquid becomes too low and, as a result, the efficiency of a coating process decreases and the operational costs increase.

Organic pigments can be divided into several types according to their particle shapes: solid-shape, hollow-shape, and doughnut-shape. To achieve a good balance between the glossiness, coatability, and fluidity of a coating liquid, an organic pigment having hollow-shaped particles with a void percentage of 40 percent or higher and an average diameter of between 0.2 and 3.0 μl is preferable.

As a binder, a water-based resin is preferably used.

As a water-based resin, a water-soluble resin or a water-dispersible resin may be used. Any type of water-based resin may be used depending on the purpose. For example, the following water-based resins may be used: polyvinyl alcohol; a modified polyvinyl alcohol such as anion-modified polyvinyl alcohol, cation-modified polyvinyl alcohol, or acetal-modified polyvinyl alcohol; polyurethane; polyvinyl pyrrolidone; a modified polyvinyl pyrrolidone such as polyvinyl pyrrolidone-vinyl acetate copolymer, vinyl pyrrolidone-dimethylaminoethyl methacrylate copolymer, quaternized vinyl pyrrolidone-dimethylaminoethyl methacrylate copolymer, or vinyl pyrrolidone-methacrylamide propyl trimethyl ammonium chloride copolymer; cellulose such as carboxymethyl cellulose, hydroxyethyl cellulose, or hydroxypropylcellulose; modified cellulose such as cationized hydroxyethyl cellulose; polyester, polyacrylic acid (ester), melamine resin, or modified versions of these substances; synthetic resin made of polyester-polyurethane copolymer; and other substances such as poly(metha)acrylic acid, poly(metha)acrylamide, oxidized starch, phosphorylated starch, self-denatured starch, cationized starch, other modified starches, polyethylene oxide, polyacrylic acid soda, and alginic acid soda. The above substances may be used individually or in combination.

Among the above substances, polyvinyl alcohol, cation-modified polyvinyl alcohol, acetal-modified polyvinyl alcohol, polyester, polyurethane, and polyester-polyeurethane copolymer are especially preferable in terms of ink-absorption rate.

Any type of water-dispersible resin may be used depending on the purpose. For example, the following water-dispersible resins may be used: polyvinyl acetate, ethylene-polyvinyl acetate copolymer, polystyrene, styrene-(metha)acrylic ester copolymer, (metha)acrylic ester polymer, polyvinyl acetate-(metha)acrylic acid (ester) copolymer, styrene-butadiene copolymer, an ethylene-propylene copolymer, polyvinyl ether, and silicone-acrylic copolymer. A water-dispersible resin may contain a cross-linking agent such as methylol melamine, methylol hydroxypropylene urea, or isocyanate. Also, a self-crosslinking copolymer containing a unit of methylol acrylamide may be used as a water-dispersible resin. Two or more of the water-dispersible resins described above may be used at the same time.

The mass ratio of the water-based resin to the pigment in the coating layer is preferably 2:100 to 100:100, and more preferably 3:100 to 50:100. The amount of the water-based resin in the coating layer is determined so that the liquid-absorption rate of a recording medium falls within a specific range.

When a water-dispersible colorant is used, whether to mix a cationic organic compound in the binder is optional. For example, primary to tertiary amines that react with sulfonic groups, carboxyl groups, or amino groups of a direct dye or an acid dye in a water-soluble ink, and form insoluble salt; or a monomer, oligomer, or polymer of quarternary ammonium salt may be used. Among them, an oligomer and a polymer of quarternary ammonium salt are especially preferable.

As a cationic organic compound, the following substances may be used: dimethylamine-epichlorohydrin polycondensate, dimethylamine-ammonia-epichlorohydrin condensate, poly(trimethyl aminoethyl-methacrylate methylsulfate), diallylamine hydrochloride-acrylamide copolymer, poly(diallylamine hydrochloride-sulfur dioxide), polyallylamine hydrochlorid, poly(allylamine hydrochlorid-diallylamine hydrochloride), acrylamide-diallylamine copolymer, polyvinylamine copolymer, dicyandiamide, dicyandiamide-ammonium chloride-urea-formaldehyde condensate, polyalkylene polyamine-dicyandiamide ammonium salt consensate, dimethyl diallyl ammonium chloride, poly(diallyl methyl amine) hydrochloride, poly(diallyl dimethyl ammonium chloride), poly(diallyl dimethyl ammonium chloride-sulfur dioxide), poly(diallyl dimethyl ammonium chloride-diallyl amine hydrochloride derivative), acrylamide-diallyl dimethyl ammonium chloride copolymer, acrylate-acrylamide-diallyl amine hydrochloride copolymer, polyethylenimine, ethylenimine derivative such as acrylamine polymer, and modified polyethylenimine alkylene oxide. The above substances may be used individually or in combination.

It is preferable to use a cationic organic compound with a low-molecular weight such as dimethylamine-epichlorohydrin polycondensate or polyallylamine hydrochlorid and a cationic organic compound with a relatively-high molecular weight such as poly(diallyl dimethyl ammonium chloride) in combination. Compared with a case where only one cationic organic compound is used, using cationic organic compounds in combination improves image density and reduces feathering.

The equivalent weight of cation in a cationic organic compound obtained by the colloid titration method (performed using polyvinyl potassium sulfate and toluidine blue) is preferably between 3 and 8 meq/g. With an equivalent weight in the above range, the dry deposit mass of the cationic organic compound falls within a preferable range. In the measurement of the equivalent weight of cation, the cationic organic compound is diluted with distilled water so that the solid content in the solution becomes 0.1 mass percent. No pH control is performed.

The dry deposit mass of the cationic organic compound is preferably between 0.3 and 2.0 $g/m^2$. If the dry deposit mass of the cationic organic compound is lower than 0.3 $g/m^2$, sufficient improvement in image density and sufficient reduction in feathering may not be achieved.

Any surfactant may be used depending on the purpose. For example, an anion surfactant, a cation surfactant, an amphoteric surfactant, or a nonionic surfactant may be used. Among the above surfactants, a nonionic surfactant is especially preferable. Adding a surfactant improves water resistance and density of an image, and thereby reduces bleeding.

For example, the following nonionic surfactants may be used: higher alcohol ethylene oxide adduct, alkylphenol ethylene oxide adduct, fatty acid ethylene oxide adduct, polyhydric alcohol fatty acid ester ethylene oxide adduct, higher aliphatic amine ethylene oxide adduct, fatty acid amide ethylene oxide adduct, fatty oil ethylene oxide adduct, ethylene oxide adduct of fat, polypropylene glycol ethylene oxide adduct, glycerol fatty acid ester, pentaerythritol fatty acid ester, sorbitol-sorbitan fatty acid ester, sucrose fatty acid ester, polyhydric alcohol alkyl ether, and alkanolamine fatty acid amide. The above substances may be used individually or in combination.

Polyhydric alcohol is not limited to a specific type and any type of polyhydric alcohol may be used depending on the purpose. For example, glycerol, trimethylolpropane, pentaerythrite, sorbitol, or sucrose may be used. Ethylene oxide adduct may be made by replacing a part of ethylene oxide with an alkylene oxide such as propylene oxide or butylene oxide to the extent that the water solubility is not affected. The percentage of the replaced part is preferably 50 percent or lower. The hydrophile-lipophile balance (HLB) of a nonionic surfactant is preferably between 4 and 15, and more preferably between 7 and 13.

The mass ratio of the surfactant to the cationic organic compound is preferably 0:100 to 10:100, and more preferably 0.1:100 to 1:100.

Other components may also be added to the coating layer to the extent that its advantageous effects are not undermined. Examples of other components include additives such as an alumina powder, a pH adjuster, an antiseptic agent, and an antioxidant.

The method of forming the coating layer is not limited to a specific method. For example, the coating layer may be formed by impregnating the base material with a coating liquid or by applying a coating liquid to the base material. For the impregnation or application of a coating liquid, a coater such as a conventional size press, a gate roll size press, a film transfer size press, a blade coater, a rod coater, an air knife coater, or a curtain coater may be used. Also, using a conventional size press, a gate roll size press, or a film transfer size press attached to a paper machine for the impregnation or application of a coating liquid may improve the efficiency of the process.

There is no specific limit to the amount of a coating liquid on the base material. However, the solid content of a coating liquid on the base material is preferably between 0.5 and 20 $g/m^2$, and more preferably between 1 and 15 $g/m^2$. After the impregnation or application of a coating liquid, the coating liquid may be dried. The temperature for this drying process is preferably between 100 and 250° C., but is not limited to the specific range.

The exemplary recording medium used in the recording method of the present invention may also have a back layer on the back of the base material, and other layers between the base material and the coating layer or between the base material and the back layer. Also, a protective layer may be provided on the coating layer. Each of the layers may be composed of one layer or multiple layers.

In the case that absorbency of liquid is within the above range of invention, the recording medium used in the recording method of the present invention may be commercially available coated paper for offset printing, coated paper for gravure other than recording medium used for ink jet.

It is preferable that grammage of the recording medium used in the recording method of the present invention is between 50 and 250 $g/m^2$. When it is less than 50 $g/m^2$, it is easy to produce poor transportation that the recording medium is clogged on the way of a transportation course so that there is no strength. When the grammage of the recording medium is over than 250 $g/m^2$, the recording medium cannot finish turning in a curve part on the way of the transportation course so that the strength of paper becomes too strong thereby it is easy to produce poor transportation that the recording medium is clogged.

Next, specific practical examples are described. However, the present invention is not limited to these practical examples.

Preparation Example 1

Preparation of a Dispersion of Polymer Fine Particles Containing a Copper Phthalocyanine Pigment To prepare a dispersion of polymer fine particles containing a copper phthalocyanine pigment, the air in a 1 L flask with a mechanical stirrer, a thermometer, a nitrogen gas inlet tube, a reflux tube, and a dropping funnel was sufficiently replaced by nitrogen gas; the 1 L flask was charged with 11.2 g of styrene, 2.8 g of acrylic acid, 12.0 g of lauryl methacrylate, 4.0 g of polyethylene glycol methacrylate, 4.0 g of styrene macromer (Toagosei Co., Ltd., brand name: AS-6), and 0.4 g of mercaptoethanol; and the temperature was raised to 65° C. Then, a mixed solution of 100.8 g styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (Toagosei Co., Ltd., brand name: AS-6), 3.6 g of mercaptoethanol, 2.4 g of azobisdimethylvaleronitrile, and 18.0 g of methyl ethyl ketone was dripped into the 1 L flask for 2.5 hours.

After the dripping was completed, a mixed solution of 0.8 g of azobisdimethylvaleronitrile and 18.0 g of methyl ethyl ketone was dripped into the 1 L flask for 0.5 hours. The resulting solution was matured for 1 hour at temperature of 65° C., 0.8 g of azobisdimethylvaleronitrile was added to the solution, and then the solution was matured further for 1 hour.

After the reaction stopped, 364 g of methyl ethyl ketone was put into the 1 L flask. As a result, 800 g of polymer solution with a concentration of 50 mass % was obtained. A portion of the obtained polymer solution was dried and its weight-average molecular weight (Mw) was measured by gel permeation chromatography (standard: polystyrene, solvent: tetrahydrofuran). The weight-average molecular weight was 15,000.

Next, 28 g of the obtained polymer solution, 26 g of copper phthalocyanine pigment, 13.6 g of 1 mol/L potassium hydroxide solution, 20 g of methyl ethyl ketone, and 30 g of ion-exchanged water were mixed and stirred sufficiently. The resulting substance was kneaded 20 times using the Tripole Roll Mill (Noritake Co., Limited, brand name: NR-84A). The obtained paste was put in 200 g of ion-exchanged water and stirred. Methyl ethyl ketone and water in the liquid was distilled away by using an evaporator. As a result, 160 g of polymer fine particle dispersion with a cyan color was obtained. The solid content of the polymer fine particle dispersion was 20.0 mass %.

The average particle diameter (D50%) of the polymer fine particles in the polymer fine particle dispersion was measured with a particle size distribution analyzer (Microtrac UPA, Nikkiso Co., Ltd.). The average particle diameter was 93 nm.

Preparation Example 2

Preparation of Dispersion of Polymer Fine Particles Containing Dimethyl Quinacridone Pigment A polymer fine particle dispersion with magenta color was prepared in substantially the same manner as the preparation example 1, except that C. I. Pigment Red 122 was used instead of a copper phthalocyanine pigment.

The average particle diameter (D50%) of the polymer fine particles in the polymer fine particle dispersion was measured with a particle size distribution analyzer (Microtrac UPA, Nikkiso Co., Ltd.). The average particle diameter was 127 nm.

Preparation Example 3

Preparation of Dispersion of Polymer Fine Particles Containing Monoazo Yellow Pigment A polymer fine particle dispersion with a yellow color was prepared in substantially the same manner as the preparation example 1, except that C. I. Pigment Yellow 74 was used instead of a copper phthalocyanine pigment.

The average particle diameter (D50%) of the polymer fine particles in the polymer fine particle dispersion was measured with a particle size distribution analyzer (Microtrac UPA, Nikkiso Co., Ltd.). The average particle diameter was 76 nm.

Preparation Example 4

Preparation of Dispersion of Carbon Black Processed with Sulfonating Agent

To prepare a carbon black dispersion, 150 g of a commercially available carbon black pigment (Printex #85, Degussa) was mixed in 400 ml of sulfolane; the solution was microdispersed with a beads mill; 15 g of amidosulfuric acid was added to the solution; and then the solution was stirred for 10 hours at 140-150° C. The obtained slurry was put in 1000 ml of ion-exchanged water, and the solution was centrifuged at 12,000 rpm. As a result, a surface-treated carbon black wet cake was obtained. The obtained carbon black wet cake was dispersed again in 2,000 ml of ion-exchanged water; the pH of the solution was adjusted with lithium hydroxide; the solution was desalted/condensed using an ultrafilter; and then the solution was filtered with a nylon filter with an average pore diameter of 1 µm. As a result, a black carbon dispersion with a pigment concentration of 10 mass % was obtained.

The average particle diameter (D50%) of the fine particles in the carbon black dispersion was measured with a particle size distribution analyzer (Microtrac UPA, Nikkiso Co., Ltd.). The average particle diameter was 80 nm.

Production Example 1

Production of Cyan Ink

To produce a cyan ink, 20.0 mass % of the dispersion of polymer fine particles containing a copper phthalocyanine pigment prepared in the preparation example 1, 23.0 mass % of 3-methyl-1,3-butanediol, 8.0 mass % of glycerin, 2.0 mass % of 2-ethyl-1,3-hexanediol, 2.5 mass % of FS-300 (DuPont) used as a fluorinated surfactant, 0.2 mass % of Proxel LV (Avecia KK) used as an antiseptic or a fungicide, 0.5 mass % of 2-amino-2-ethyl-1,3-propanediol, and a certain amount of ion-exchanged water were mixed (100 mass % in total); and the mixture was filtered using a membrane filter with an average pore diameter of 0.8 µm.

Production Example 2

Production of Magenta Ink

To produce a magenta ink, 20.0 mass % of the dispersion of polymer fine particles containing a dimethyl quinacridone pigment prepared in the preparation example 2, 22.5 mass % of 3-methyl-1,3-butanediol, 9.0 mass % of glycerin, 2.0 mass % of 2-ethyl-1,3-hexanediol, 2.5 mass % of FS-300 (DuPont) used as a fluorinated surfactant, 0.2 mass % of Proxel LV (Avecia KK) used as an antiseptic or a fungicide, 0.5 mass % of 2-amino-2-ethyl-1,3-propanediol, and a certain amount of ion-exchanged water were mixed (100 mass % in total); and the mixture was filtered using a membrane filter with an average pore diameter of 0.8 µm.

Production Example 3

Production of Yellow Ink

To produce a yellow ink, 20.0 mass % of the dispersion of polymer fine particles containing a monoazo yellow pigment prepared in the preparation example 3, 24.5 mass % of 3-methyl-1,3-butanediol, 8 mass % of glycerin, 2.0 mass % of 2-ethyl-1,3-hexanediol, 2.5 mass % of FS-300 (DuPont) used as a fluorinated surfactant, 0.2 mass % of Proxel LV (Avecia KK) used as an antiseptic or a fungicide, 0.5 mass % of 2-amino-2-methyl-1,3-propanediol, and a certain amount of ion-exchanged water were mixed (100 mass % in total); and the mixture was filtered using a membrane filter with an average pore diameter of 0.8 µm.

Production Example 4

Production of Black Ink

To produce a black ink, 20.0 mass % of the carbon black dispersion prepared in the preparation example 4, 22.5 mass % of 3-methyl-1,3-butanediol, 7.5 mass % of glycerin, 2.0 mass % of 2-pyrrolidone, 2.0 mass % of 2-ethyl-1,3-hexanediol, 2.5 mass % of FS-300 (DuPont) used as a fluorinated surfactant, 0.2 mass % of Proxel LV (Avecia KK) used as an antiseptic or a fungicide, 0.5 mass % of 2-amino-2-methyl-1,3-propanediol, and a certain amount of ion-exchanged water were mixed (100 mass % in total); and the mixture was filtered using a membrane filter with an average pore diameter of 0.8 μm.

The surface tensions and viscosities of the inks produced in the production examples 1 through 4 were measured as described below. The results are shown in table 2 below.

<Measurement of Viscosity>

The viscosities of the inks were measured at 25° C. with the R-500 Viscometer of Toki Sangyo Co., Ltd. (cone 1° 34'× R24, 60 rpm, after 3 minutes).

<Measurement of Surface Tension>

The static surface tensions of inks were measured at 25° C. with a surface tensiometer (CBVP-Z of Kyowa Interface Science Co., Ltd.) using a platinum plate.

TABLE 2

|  | Viscosity (mPa·s) | Surface tension (mN/m) |
|---|---|---|
| Production example 1 | 8.05 | 25.4 |
| Production example 2 | 8.09 | 25.4 |
| Production example 3 | 8.11 | 25.7 |
| Production example 4 | 8.24 | 25.4 |

Production of Base Material

A base material with a grammage of 79 g/m² was produced using a fourdrinier from 0.3 mass % slurry made of materials in the formula below. In the size press step of the papermaking process, an oxidized starch solution was applied on the base material. The solid content of the oxidized starch on the base material was 1.0 g/m².

Leaf bleached kraft pulp (LBKP) 80 mass %

Needle bleached kraft pulp (NBKP) 20 mass %

Precipitated calcium carbonate (brand name: TP-121, Okutama Kogyo Co., Ltd.) 10 mass %

Aluminum sulfate 1.0 mass %

Amphoteric starch (brand name: Cato3210, Nippon NSC Ltd.) 1.0

Neutral rosin size (brand name: NeuSize M-10, Harima Chemicals, Inc.) 0.3 mass %

Retention aid (brand name: NR-11LS, HYMO Co., Ltd.) 0.02 mass %

Production Example 1

Production of Recording Medium 1

A coating liquid with a solid content concentration of 60 mass % was produced by mixing 70 mass % of clay used as a pigment in which clay 97 mass % of particles have a diameter of 2 μm or smaller; 30 mass % of heavy calcium carbonate with an average particle diameter of 1.1 μm; 8 mass % of styrene-butadiene copolymer emulsion, used as an adhesive, with a glass-transition temperature (Tg) of −5° C.; 1 mass % of phosphoric esterified starch; 0.5 mass % of calcium stearate used as an aid; and water.

To produce the recording medium 1, the obtained coating liquid was applied on both sides of the above base material so that 8 g/m² of solid content of the coating liquid adheres to each side using a blade coater; and the base material was dried by hot air and supercalendered.

Production Example 2

Production of Recording Medium 2

A coating liquid with a solid content concentration of 60 mass % was produced by mixing 70 mass % of clay used as a pigment in which clay 97 mass % of particles have a diameter of 2 μm or smaller; 30 mass % of heavy calcium carbonate with an average particle diameter of 1.1 μm; 7 mass % of styrene-butadiene copolymer emulsion, used as an adhesive, with a glass-transition temperature (Tg) of −5° C.; 0.7 mass % of phosphoric esterified starch; 0.5 mass % of calcium stearate used as an aid; and water.

To produce the recording medium 2, the obtained coating liquid was applied on both sides of the above base material so that 8 g/m² of solid content of the coating liquid adheres to each side using a blade coater; and the base material was dried by hot air and supercalendered.

First Embodiment

Ink Set, Recording Medium, and Image Recording

By a conventional method, an ink set 1 made up of the cyan ink produced in the production example 1, the magenta ink produced in the production example 2, the yellow ink produced in the production example 3, and the black ink produced in the production example 4 was prepared.

Images were printed on the recording medium 1 with the ink set 1 (largest ink drop size: 18 pl) at an image resolution of 600 dpi using a 300 dpi drop on demand printer prototype apparatus having nozzles with a nozzle resolution of 384 according to an embodiment of the present invention. The total amount of ink per unit area for a secondary color was limited to 140% and solid-color images and characters were formed.

Second Embodiment

Ink Set, Recording Medium, and Image Recording

Images were formed in substantially the same manner as the first embodiment, except that the recording medium 2 was used as a recording medium.

Third Embodiment

Ink Set, Recording Medium, and Image Recording

Images were formed in substantially the same manner as the first embodiment, except that a commercially available coated paper for gravure printing (brand name: Space DX, grammage=56 g/m², Nippon Paper Industries Co., Ltd.) (hereafter called a recording medium 3) was used as a recording medium.

For each of the recording medium 1, the recording medium 2, the recording medium 3, the amount of transferred pure water and the amount of transferred cyan ink produced in the production example 1 were measured as described below using a dynamic scanning absorptometer. The results are shown in table 3.

<Measurement of Amounts of Transferred Pure Water and Cyan Ink with Dynamic Scanning Absorptometer>

For each of the above recording media, the amounts of transferred pure water and cyan ink were measured using a dynamic scanning absorptometer (K350 series, type D, Kyowa Co., Ltd.) at 25° C. and 50% RH. The amounts of transferred pure water and cyan ink at a contact time of 100 ms and 400 ms were obtained by interpolation, using the transferred amounts measured at time points around each contact time.

TABLE 3

|  |  | Pure water | | Ink of production example 1 ($\gamma$= 25) | |
|---|---|---|---|---|---|
|  |  | Contact time: 100 ms | Contact time: 400 ms | Contact time: 100 ms | Contact time: 400 ms |
| First embodiment | Recording medium 1 | 10.1 ml/m$^2$ | 20.2 ml/m$^2$ | 7.2 ml/m$^2$ | 14.8 ml/m$^2$ |
| Second embodiment | Recording medium 2 | 25.2 ml/m$^2$ | 28.5 ml/m$^2$ | 14.6 ml/m$^2$ | 19.4 ml/m$^2$ |
| Third embodiment | Recording medium 3 | 10.4 ml/m$^2$ | 21.8 ml/m$^2$ | 6.4 ml/m$^2$ | 8.8 ml/m$^2$ |

Qualities of the images printed in the first through third embodiments were evaluated in terms of beading, bleeding, spur marks, and glossiness. The results are shown in table 4.

<Beading>

The degree of beading in the printed green solid-color image was evaluated by eye observation according to the evaluation criteria below.

[Evaluation Criteria]
AA: No beading is observed and image is evenly printed.
BB: Beading is slightly observed.
CC: Beading is clearly observed.
DD: Excessive beading is observed.

<Bleeding>

The degree of bleeding of the printed black characters in the yellow background was evaluated by eye observation according to the evaluation criteria below.

[Evaluation Criteria]
AA: No bleeding is observed and characters are clearly printed.
BB: Bleeding is slightly observed.
CC: Bleeding is clearly observed.
DD: Excessive bleeding is observed and outlines of characters are blurred.

<Spur Marks>

The degree of spur marks in the printed images was evaluated by eye observation according to the evaluation criteria below.

[Evaluation Criteria]
AA: No spur mark is observed.
BB: Spur marks are observed slightly.
CC: Spur marks are clearly observed.
DD: Excessive spur marks are observed.

<Glossiness>

The degree of glossiness of the printed images was evaluated by eye observation according to the evaluation criteria below.

[Evaluation Criteria]
AA: Images are highly glossy.
BB: Images are glossy.
CC: Images are not glossy.

TABLE 4

|  | Beading | Bleeding | Spur mark | Glossiness of image |
|---|---|---|---|---|
| First embodiment | BB | BB | BB | BB |
| Second embodiment | AA | AA | AA | BB |
| Third embodiment | BB | BB | BB | AA |

APPENDIX

Typical embodiments (1) to (40) of the present invention are provided below.

Embodiment (1) is a liquid ejecting head comprising a nozzle configured to eject a liquid drop of recording liquid, a liquid chamber communicating to the nozzle, and an energy generating device configured to generate energy for pressurizing recording liquid in the liquid chamber, characterized in that a flow channel forming member configured to form a flow channel for the recording liquid is made of a metal material containing nickel and a peak intensity for a (200) face of nickel is higher than a peak intensity for a (111) face of nickel which intensities are measured by means of X-ray diffraction analysis.

Embodiment (2) is the liquid ejecting head according to embodiment (1) above, characterized in that the metal material which makes the flow channel forming member contains thallium.

Embodiment (3) is the liquid ejecting head according to embodiment (2) above, characterized in that a content of thallium is not greater than 1% by mass.

Embodiment (4) is the liquid ejecting head according to embodiment (1) above, characterized in that the flow channel forming member contains cobalt.

Embodiment (5) is the liquid ejecting head according to embodiment (4) above, characterized in that a content of cobalt is not greater than 1% by mass.

Embodiment (6) is the liquid ejecting head according to embodiment (1) above, characterized in that the flow channel forming member contains manganese.

Embodiment (7) is the liquid ejecting head according to embodiment (4) above, characterized in that a content of manganese is not greater than 1% by mass.

Embodiment (8) is a liquid ejecting head comprising a nozzle configured to eject a liquid drop of recording liquid, a liquid chamber communicating to the nozzle, and an energy generating device configured to generate energy for pressurizing recording liquid in the liquid chamber, characterized in that a flow channel forming member configured to form a flow channel for the recording liquid is made of a metal material containing nickel and thallium.

Embodiment (9) is the liquid ejecting head according to embodiment (8) above, characterized in that a peak intensity for a (200) face of nickel is higher than a peak intensity for a (111) face of nickel which intensities are measured by X-ray diffraction analysis.

Embodiment (10) is the liquid ejecting head according to any of embodiments (1) to (9) above, characterized in that an intensity ratio of oriented crystallographic faces which is defined as a ratio of a peak intensity for a (200) face of nickel to a peak intensity for a (111) face of nickel satisfies a relationship of I(200)/I(111)>1.0, wherein I(111) is the peak intensity for a (111) face of nickel and I(200) is the peak intensity for a (200) face of nickel which intensities are measured by means of a X-ray diffraction analysis.

Embodiment (11) is the liquid ejecting head according to any of embodiments (1) to (10) above, characterized in that the flow channel forming member contains sulfur and a content of sulfur is not greater than 0.1% by mass.

Embodiment (12) is the liquid ejecting head according to any of embodiments (1) to (11) above, characterized in that the flow channel forming member is a nozzle plate configured to form the nozzle.

Embodiment (13) is the liquid ejecting head according to any of embodiments (1) to (12) above, characterized in that the flow channel forming member is a flow channel plate configured to form the liquid chamber.

Embodiment (14) is the liquid ejecting head according to any of embodiments (1) to (13) above, characterized in that the low channel forming member is a vibrating plate having a member configured to form a wall surface of the liquid chamber.

Embodiment (15) is the liquid ejecting head according to any of embodiments (1) to (14) above, characterized by comprising at least two members selected from the group consisting of a nozzle plate configured to form the nozzle, a flow channel plate configured to form the liquid chamber, and a vibrating plate having a member configured to form a wall surface of the liquid chamber, wherein the two members are integrally formed.

Embodiment (16) is the liquid ejecting head according to any of embodiments (1) to (15) above, characterized in that the flow channel forming member is formed by an electroforming method.

Embodiment (17) is the liquid ejecting head according to any of embodiments (1) to (16) above, characterized in that a Vickers hardness of the flow channel forming member is in a range of 250 (Hv) to 500 (Hv).

Embodiment (18) is the liquid ejecting head according to any of embodiments (1) to (17) above, characterized in that it is a side-shooter-type head in which a direction of ejecting the liquid drop is different from a direction of a flow channel for the recording liquid.

Embodiment (19) is an image forming apparatus comprising a recording head configured to eject a liquid drop of recording liquid, characterized in that the recording head is the liquid ejecting head according to any of embodiments (1) to (18) above.

Embodiment (20) is the image forming apparatus according to embodiment (19) above, characterized in that the recording liquid is an ink containing a dye as a coloring material.

Embodiment (21) is the image forming apparatus according to embodiment (19) above, characterized in that the recording liquid is an ink containing a pigment as a coloring material.

Embodiment (22) is the image forming apparatus according to embodiment (19) above, characterized in that the recording liquid is an ink containing a polymer fine particle in which a pigment particle as a coloring material is contained.

Embodiment (23) is the image forming apparatus according to embodiment (19) above, characterized in that the recording liquid is an ink containing benzotriazole.

Embodiment (24) is a device configured to eject a liquid drop from a liquid ejecting head, characterized by comprising the liquid ejecting head according to any of embodiments (1) to (18) above.

Embodiment (25) is a recording method characterized by ejecting a liquid drop of recording liquid from the liquid ejecting head according to any of embodiments (1) to (18) above, so as to perform recording on a recording medium.

Embodiment (26) is the recording method according to embodiment (25) above, characterized in that the recording medium is a medium for recording which has a supporter and a coating layer on at least one face of the supporter.

Embodiment (27) is the recording method according to embodiment (25) or (26) above, characterized in that an amount of the recording liquid transferred to the recording medium for a contact time period of 100 ms is 2-40 ml/m$^2$ and an amount of the recording liquid transferred to the recording medium for a contact time period of 400 ms is 3-50 ml/m$^2$ which amounts are measured at 23° C. and 50% RH and by a dynamic scanning liquid absorption meter.

Embodiment (28) is the recording method according to embodiment (25) or (26) above, characterized in that an amount of pure water transferred to the recording medium for a contact time period of 100 ms is 2-45 ml/m$^2$ and an amount of pure water transferred to the recording medium for a contact time period of 400 ms is 3-50 ml/m$^2$ which amounts are measured at 23° C. and 50% RH and by a dynamic scanning liquid absorption meter.

Embodiment (29) is the recording method according to embodiment (25) above, characterized in that the recording medium comprises at least a substrate and a coating layer and an amount of an adhering solid content in the coating layer is 0.5-20.0 g/m$^2$.

Embodiment (30) is the recording method according to embodiment (25) above, characterized in that a weight of the recording medium is 50-250 g/m$^2$.

Embodiment (31) is the recording method according to embodiment (25) above, characterized in that the recording medium is supercalendared.

Embodiment (32) is the recording method according to any of embodiments (25) to (31) above, characterized in that the recording medium contains a pigment and the pigment is kaolin.

Embodiment (33) is the recording method according to any of embodiments (25) to (31) above, characterized in that the recording medium contains a pigment and the pigment is heavy calcium carbonate.

Embodiment (34) is the recording method according to any of embodiments (25) to (33) above, characterized in that the recording medium contains an aqueous resin.

Embodiment (35) is the recording method according to embodiment (34) above, characterized in that the aqueous resin is a water-soluble resin or a water-dispersive resin.

Embodiment (36) is the recording method according to any of embodiments (25) to (35) above, characterized in that the recording liquid contains, at least, water, a coloring agent, and a wetting agent.

Embodiment (37) is the recording method according to any of embodiments (25) to (36) above, characterized in that a surface tension of the recording liquid at 25° C. is 15-40 mN/m.

Embodiment (38) is the recording method according to any of embodiments (25) to (37) above, characterized in that the recording liquid contains a dispersive coloring agent as a coloring agent and an average particle diameter of the dispersive coloring agent is 0.01-0.16 μm.

Embodiment (39) is the recording method according to any of embodiments (25) to (38) above, characterized in that a viscosity of the recording liquid at 25° C. is 1-30 mPa·sec.

Embodiment (40) is the recording method according to any of embodiments (25) to (39) above, characterized in that the recording liquid contains a surfactant and the surfactant is a fluorine-containing surfactant.

According to a liquid ejecting head of at least one typical embodiment described above, there is no or less influence of brittleness and heat shrinkage in a heat treatment process and the precision of jointing or the accuracy of dimension is improved whereby a higher quality liquid ejecting head can be obtained, since a flow channel forming member configured to form a flow channel for recording liquid is made of a metal material containing nickel and a peak intensity for a (200)

face of nickel is higher than a peak intensity for a (111) face of nickel which intensities are measured by means of X-ray diffraction analysis.

According to a liquid ejecting head of at least one typical embodiment described above, there is no or less influence of brittleness and heat shrinkage in a heat treatment process and the precision of jointing or the accuracy of dimension is improved whereby a higher quality liquid ejecting head can be obtained, since a flow channel forming member configured to form a flow channel for recording liquid is made of a metal material containing nickel and thallium and, therefore, there can be easily obtained a configuration such that a peak intensity for a (200) face of nickel is higher than a peak intensity for a (111) face of nickel which intensities are measured by X-ray diffraction analysis.

According to an image forming apparatus of at least one typical embodiment described above, a higher quality image can be formed, since a liquid ejecting head of at least one typical embodiment described above is provided.

According to a device configured to eject a liquid drop, of at least one typical embodiment described above, a device configured to eject a liquid drop which comprises a higher quality liquid ejecting head can be obtained, since a liquid ejecting head of at least one typical embodiment described above is provided.

According to a recording method of at least one typical embodiment described above, a higher quality image can be recorded, since recording is performed by ejecting a liquid drop from a liquid ejecting head of at least one typical embodiment described above.

The present invention is not limited to the specifically disclosed embodiment(s) and variations and/or modifications may be made in the embodiment(s) without departing from the scope of the present invention.

The foreign priority of the present application is claimed which is based on Japanese patent application No. 2005-327468 filed on Nov. 11, 2005 and the Japanese patent application No. 2006-025111 filed on Feb. 1, 2006, the entire contents of which applications are hereby incorporated by reference.

INDUSTRIAL APPLICABILITY

The present invention can be applied to a liquid ejecting head, particularly, a liquid ejecting head whose surface is subjected to a water-repellency treatment, an image forming apparatus, particularly, an image forming apparatus with the liquid ejecting head, a device for ejecting a liquid drop, and a recording method.

The invention claimed is:

1. A liquid ejecting head comprising a nozzle configured to eject a liquid drop of recording liquid, a liquid chamber communicating to the nozzle, and an energy generating device configured to generate energy for pressurizing recording liquid in the liquid chamber, wherein a flow channel forming member configured to form a flow channel for the recording liquid is made of a metal material containing nickel and a peak intensity for a (200) face of nickel is higher than a peak intensity for a (111) face of nickel which intensities are measured by means of X-ray diffraction analysis.

2. The liquid ejecting head as claimed in claim 1, wherein the metal material which makes the flow channel forming member contains thallium.

3. The liquid ejecting head as claimed in claim 2, wherein a content of thallium is not greater than 1% by mass.

4. The liquid ejecting head as claimed in claim 1, wherein the flow channel forming member contains cobalt.

5. The liquid ejecting head as claimed in claim 4, wherein a content of cobalt is not greater than 1% mass.

6. The liquid ejecting head as claimed in claim 1, wherein the flow channel forming member contains manganese.

7. The liquid ejecting head as claimed in claim 6, wherein a content of manganese is not greater than 1% by mass.

8. The liquid ejecting head as claimed in claim 1, in which an intensity ratio of oriented crystallographic faces which is defined as a ratio of a peak intensity for a (200) face of nickel to a peak intensity for a (111) face of nickel satisfies a relationship of $I(200)/I(111)>1.0$, wherein $I(111)$ is the peak intensity for a (111) face of nickel which intensities are measured by means of an X-ray diffraction analysis.

9. The liquid ejecting head as claimed in claim 1, wherein the flow channel forming member contains sulfur and a content of sulfur is not greater than 0.1% by mass.

10. The liquid ejecting head as claimed in claim 1, wherein the flow channel forming member is a nozzle plate configured to form the nozzle.

11. The liquid ejecting head as claimed in claim 1, wherein the flow channel forming member is a flow channel plate configured to form the liquid chamber.

12. The liquid ejecting head as claimed in claim 1, wherein the low channel forming member is a vibrating plate having a member configured to form a wall surface of the liquid chamber.

13. The liquid ejecting head as claimed in claim 1, which comprises at least two members selected from the group consisting of a nozzle plate configured to form the nozzle, a flow channel plate configured to form the liquid chamber, and a vibrating plate having a member configured to form a wall surface of the liquid chamber, wherein the two member are integrally formed.

14. The liquid ejecting head as claimed in claim 1, wherein the flow channel forming member is formed by an electroforming method.

15. The liquid ejecting head as claimed in claim 1, wherein a Vickers hardness of the flow channel forming member is in the range of 250 (Hv) to 500 (Hv).

16. The liquid ejecting head as claimed in claim 1, which is a side-shooter-type head in which a direction of ejecting the liquid drop is different from a direction of a flow channel for the recording liquid.

17. An image forming apparatus comprising a recording head configured to eject a liquid drop of recording liquid, wherein the recording head is the liquid ejecting head as claimed in claim 1.

18. The image forming head as claimed in claim 17, wherein the recording liquid is an ink containing a polymer fine particle in which a pigment particle as a coloring material is contained.

19. A liquid ejecting head comprising a nozzle configured to eject a liquid drop of recording liquid, a liquid chamber communicating to the nozzle, and an energy generating device configured to generate energy for pressurizing recording liquid in the liquid chamber, wherein a flow channel forming member configured to form a flow channel for the recording liquid is made of a metal material containing nickel and thallium.

20. The liquid ejecting head as claimed in claim 19, wherein a peak intensity for a (200) face of nickel is higher than a peak intensity for a (111) face of nickel which intensities are measured by X-ray diffraction analysis.

* * * * *

UNITED STATES PATENT AND TRADEMARK OFFICE
CERTIFICATE OF CORRECTION

PATENT NO. : 7,658,477 B2  Page 1 of 1
APPLICATION NO. : 11/794789
DATED : February 9, 2010
INVENTOR(S) : Takao Kamito It is certified that error appears in the above-identified patent and that said Letters Patent is hereby corrected as shown below:

On the title page item (86) should read:
--(86)  PCT No.:  PCT/JP2006/322904--

Signed and Sealed this

Thirteenth Day of July, 2010

David J. Kappos
*Director of the United States Patent and Trademark Office*